US007675384B2

(12) United States Patent
Itoh et al.

(10) Patent No.: US 7,675,384 B2
(45) Date of Patent: Mar. 9, 2010

(54) COMPOSITE RIGHT/LEFT HANDED (CRLH) HYBRID-RING COUPLERS

(75) Inventors: Tatsuo Itoh, Rolling Hills, CA (US); Christophe Caloz, Montreal (CA); I-Hsiang Lin, Mountain View, CA (US); Hiroshi Okabe, Tokyo (JP)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/122,347

(22) Filed: May 16, 2008

(65) Prior Publication Data

US 2009/0002093 A1 Jan. 1, 2009

Related U.S. Application Data

(62) Division of application No. 11/092,141, filed on Mar. 28, 2005, now Pat. No. 7,508,283.

(60) Provisional application No. 60/556,981, filed on Mar. 26, 2004.

(51) Int. Cl.
*H01P 5/12* (2006.01)
*H01P 5/22* (2006.01)
*H04B 1/58* (2006.01)

(52) U.S. Cl. ........................ 333/118; 333/109; 333/120

(58) Field of Classification Search ................. 333/109, 333/117, 118, 120, 24 R
See application file for complete search history.

(56) References Cited

U.S. PATENT DOCUMENTS 4,565,984 A 1/1986 Castera et al.
5,511,238 A 4/1996 Bayraktaroglu
5,872,491 A 2/1999 Kim et al.
5,874,915 A 2/1999 Lee et al.
6,426,722 B1 7/2002 Sievenpiper et al.
6,472,950 B1 10/2002 London (Continued)

FOREIGN PATENT DOCUMENTS

JP 50037323 A 4/1975

(Continued)

OTHER PUBLICATIONS

Okabe et al., A Compact Enhanced-Bandwidth Hybrid Ring Using an Artificial Lumped-Element Left-Handed Transmission-Line Section, Mar. 2004, IEEE, vol. 52, No. 3, pp. 798-804.*

(Continued)

*Primary Examiner*—Dean O Takaoka
(74) *Attorney, Agent, or Firm*—John P. O'Banion

(57) ABSTRACT

High-frequency couplers and coupling techniques are described utilizing artificial composite right/left-handed transmission line (CRLH-TL). Three specific forms of couplers are described; (1) a coupled-line backward coupler is described with arbitrary tight/loose coupling and broad bandwidth; (2) a compact enhanced-bandwidth hybrid ring coupler is described with increased bandwidth and decreased size; and (3) a dual-band branch-line coupler that is not limited to a harmonic relation between the bands. These variations are preferably implemented in a microstrip fabrication process and may use lumped-element components. The couplers and coupling techniques are directed at increasing the utility while decreasing the size of high-frequency couplers, and are suitable for use with separate coupler or couplers integrated within integrated devices.

16 Claims, 14 Drawing Sheets

U.S. PATENT DOCUMENTS

| | | | |
|---|---|---|---|
| 6,525,695 | B2 | 2/2003 | McKinzie, III |
| 6,552,696 | B1 | 4/2003 | Sievenpiper et al. |
| 7,068,234 | B2 | 6/2006 | Sievenpiper |
| 7,196,666 | B2 | 3/2007 | Allen et al. |
| 7,205,941 | B2 | 4/2007 | Wang et al. |
| 7,256,753 | B2 | 8/2007 | Werner et al. |
| 7,391,288 | B1 | 6/2008 | Itoh et al. |
| 2002/0167372 | A1 | 11/2002 | Ishizaki et al. |
| 2003/0011522 | A1 | 1/2003 | McKinzie, III et al. |
| 2003/0071697 | A1 | 4/2003 | Souetinov et al. |
| 2004/0066251 | A1 | 4/2004 | Eleftheriades et al. |
| 2004/0140862 | A1 | 7/2004 | Brown et al. |
| 2004/0227668 | A1 | 11/2004 | Sievenpiper |
| 2005/0225492 | A1 | 10/2005 | Metz |
| 2005/0253667 | A1 | 11/2005 | Itoh et al. |
| 2006/0066422 | A1 | 3/2006 | Itoh et al. |
| 2006/0145927 | A1 | 7/2006 | Choi et al. |
| 2008/0048917 | A1 | 2/2008 | Achour et al. |
| 2008/0204327 | A1 | 8/2008 | Lee et al. |

FOREIGN PATENT DOCUMENTS

KR 1020030022407 A 3/2003

OTHER PUBLICATIONS

Okabe et al., A Compact Enhanced-Bandwidth Hybrid Ring using a Left-Handed Transmission-Line Section, 2003, IEEE, TU2D-6, pp. 329-332.*

C. Caloz et al. A novel composite right/left-handed coupled-line directional coupler with arbitrary coupling level and broad bandwidth. IEEE Transactions on Microwave Theory and Techniques, vol. 52, No. 3, pp. 980-991 (2004).

C. Caloz et al. A broadband left-handed coupled-line backward coupler with arbitrary coupling level. IEEE MTT-S International Microwave Symposium, Jun. 7-13, 2003, pp. 317-318.

A. Lai et al. Composite right/left handed transmission line metamaterials. IEEE Microwave Magazine, Sep. 2004, pp. 34-50.

A. Lai et al. Dual-mode compact microstrip antenna based on fundamental backward wave. Proceedings of Asia-Pacific Microwave Conference, Suzhou, China, Dec. 4-7, 2005, vol. 4, pp. xx. (See the abstract, figures 3 and 5, and 2nd and 3rd pages).

L. Liu et al. Forward coupling phenomena between artificial left-handed transmission lines. J. Applied Physics, vol. 92, No. 9, Nov. 2002, pp. 5560-5565.

Christophe Caloz et al., "A Novel Composite Right/Left-Handed Coupled-Line Directional Coupler With Arbitrary Coupling Level and Broad Bandwidth" Mar. 2004, IEEE, vol. 52 No. 3, pp. 980-991.

Christophe Caloz et al., "A Broadband Left-Handed (LH) Coupled-Line Backward Coupler with Arbitrary Coupling Level" Jul. 2003, IEEE MTT-S Digest 317-320.

Lei Liu et al., "Forward coupling phenomena between artificial left-handed transmission lines" Nov. 2002, Journal of Applied Physics, vol. 92 No. 9, pp. 5560-5565.

Tatsuo Itoh et al., Application of the transmission line theory of left-handed (LH) materials to the realization of a microstrip "LH line" Jun. 2002, IEEE-APS Int'l Symp. Digets, vol. 2, pp. 412-415.

V.G. Veselago, "The Electrodynamics of Substances with Simultaneously Negative Values . . . " Jan.-Feb. 1968 Soviet Physics Uspekhi, vol. 10 No. 4, pp. 509-514.

R.A. Shelby et al., "Experimental Verification of a Negative Index of Refraction" 2002, Science, vol. 292 No. 6, pp. 77-79.

J.B. Pendry, "Negative Refraction Makes a Perfect Lens" Oct. 2000, Phys. Rev. Lett, vol. 85 No. 18, pp. 3966-3969.

R. Mongia et al., "RF and Microwave Coupled-Line Circuits" 1999, Norwood MA, Artech House.

J. Lange, "Interdigitated Stripline Quadrature Hybrid" IEEE Trans. Microwave Theory and Tech, Dec. 1969, vol. MTT-26, pp. 1150-1151.

D.R. Smith et al., "Composite Medium with Simultaneously Negative Permeability and Permittivity" May 2000, Phys. Rev. Lett., vol. 84 No. 18, pp. 4184-4187.

J.B. Pendry et al., "Magnetism from Conductors and Enhanced Non-linear Phenomena", Nov. 1999, IEEE Trans. Microwave Theory and Tech, vol. 47 No. 11, pp. 2075-2084.

Christophe Caloz et al., "Transmission Line Approach of Left-Handed (LH) Materials", Jun. 2002, USNC/URSI National Radio Science Meeting, vol. 1, San Antonio, TX, p. 39.

Ashwin K. Iyer et al., "Negative Refractive Index Metamaterials Supporting 2-D Waves" Jun. 2002, IEEE-MTT Int'l Symp., Seattle, WA, pp. 1067-1070.

Lei Liu et al., "Dominant mode leaky-wave antenna with backfire-to-endfire scanning capability" Nov. 2002, Electron Lett., vol. 38, No. 23, pp. 1414-1416.

S. Ramo et al., "Fields and Waves in Communication Electronics", 2002, John Wiley and Sons.

R.W. Vogel, "Analysis and Design of Lumped- and Lumped-Distributed-element Directional Couplers for MIC and MMIC Applications", Feb. 1992, IEEE Trans. Microwave Theory Tech., vol. 43 No. 12, pp. 253-262.

Tetsuo Hirota et al., "Reduced-Size Branch-Line and Rat-Race Hybrids for Uniplanar MMIC's" Mar. 1990, IEEE Trans. Microwave Theory Tech., vol. 38 No. 3, pp. 270-275.

Lu Fan et al., "Wide-Band Reduced-Size Uniplanar Magic-T, Hybrid-Ring, and de Ronde's CPW-Slot Couplers", Dec. 1995, IEEE Trans. Microwave Theory Tech., vol. 43 No. 12, pp. 2749-2758.

A. Hellemans, "Left-Handed Material Reacts to 3-D Light", Oct. 2002, IEEE Spectrum, vol. 39, pp. 24-26.

R.A. Shelby et al., "Microwave transmission through a two-dimensional, isotropic, left-handed metamaterial" Jan. 2001, App. Phys. Letters, vol. 78 No. 4, pp. 489-491.

Liang-Hung Lu et al., "Design and Implementation of Micromachined Lumped Quadrature (90) Hybrids", Jun. 2001, IEEE MTT-S Int. Microwave Symp. Dig. vol. 2, pp. 1285-1288.

J. Reeds et al., "A Method of Analysis of Symmetrical Four-Port Networks" Oct. 1956, IRE Trans. on Microwave Theory and Techniques, vol. MTT-4, pp. 246-252.

Lin et al. A branch-line coupler with two arbitrary operating frequencies using left-handed transmission lines., 2003, IEEE MTT-S, TU2D-5, pp. 325-328.

* cited by examiner

COMPOSITE RIGHT/LEFT HANDED (CRLH) HYBRID-RING COUPLERS

CROSS-REFERENCE TO RELATED APPLICATIONS

This application is a divisional of, and claims priority to, U.S. patent application Ser. No. 11/092,141 filed on Mar. 28, 2005, now U.S. Pat. No. 7,508,283, incorporated herein by reference in its entirety, which claims priority to U.S. provisional application Ser. No. 60/556,981 filed on Mar. 26, 2004, incorporated herein by reference in its entirety.

STATEMENT REGARDING FEDERALLY SPONSORED RESEARCH OR DEVELOPMENT

This invention was made with Government support under Grant No. N00014-01-0803, awarded by the Department of Defense ARO MURI. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to high-frequency coupling devices, and more particularly to microwave couplers utilizing artificial composite right/left-handed transmission lines.

2. Description of Related Art

Couplers are used in circuits to generate separate signal channels with desirable characteristics. Conventional couplers may be divided into two categories: coupled-line couplers (backward, forward) and tight-couplers (e.g., branch-line, rat-race, and so forth). While the former are limited to loose coupling levels (typically less than −3 dB) because of the excessively small gap required for tight coupling, the latter are limited in bandwidth (i.e., typically less than 20%).

Coupler designs currently in use suffer from a number of shortcomings. For example, a coupler referred to as the "Lange coupler" can be classified mid-way between the two categories of coupled-line couplers and tight-couplers, yet it has the short-coming of requiring cumbersome bonding wires. The Lange coupler is described in the paper "Interdigital Stripline Quadrature Hybrid", from IEEE Trans. Microwave Theory and Technology, volume MTT-26, pp. 1150-1151, published December 1969, incorporated herein by reference.

Conventional hybrid rings, often referred to as rat-race couplers, have the shortcomings of narrow bandwidth and large size.

Conventional branch-line couplers (or quadrature hybrids) are characterized by repetition of their coupling characteristics at odd harmonics of the design frequency. Since it is unlikely that a dual-band application would require exactly $f_0$ and 3 $f_0$, whereby in practice this coupler is virtually limited to single-band operation at $f_0$.

Accordingly a need exists for high-frequency coupling devices which provide increased flexibility with regard to type of coupling and harmonic frequency while being amenable to embodiment in compact forms.

BRIEF SUMMARY OF THE INVENTION

Artificial right-handed (RH), left-handed (LH) and composite right/left-handed (CRLH) transmission lines (TL) are constituted of series-L/shunt-C, series-C/shunt-L, and the series combination of the two, respectively. The present invention teaches novel microwave couplers based on a new type of artificial CRLH-TL. The embodiments described herein are generally categorized as: (a) coupled-line backward coupler with arbitrary tight/loose coupling; (b) compact enhanced-bandwidth hybrid ring coupler; and (c) dual-band non-harmonic branch-line coupler.

A. A coupled-line backward coupler with arbitrary tight/loose coupling.

Conventional couplers may be divided into two general categories: coupled-line couplers (backward, forward) and tight-couplers (e.g., branch-line, rat-race, and so forth). The CRLH coupler of the present invention reunites the advantages of these two categories (broad bandwidth and arbitrary coupling), without the short-coming of bonding wires, for example as in the conventional Lange coupler.

An embodiment of this coupler can be composed of two parallel microstrip CRLH-TLs. This coupler can achieve arbitrary coupling levels (i.e., up to −0.5 dB) despite a relatively wide gap between the two TLs (typically s/h=0.2; s: gap between lines, h: substrate thickness), while conventional coupled-line couplers cannot achieve tight coupling levels. In addition, the coupler of the present invention exhibits a generously broad bandwidth, on the order of 35%, which it should be appreciated is substantially larger than tight non-coupled line conventional couplers providing approximately 20% bandwidth.

B. A compact enhanced-bandwidth hybrid ring coupler.

One embodiment of the invention is a compact enhanced-bandwidth hybrid ring coupler which incorporates a −90° CRLH-TL, implemented in lumped components, such as SMT chips or similar small surface mountable devices, instead of the +270° line section of the conventional hybrid ring. A 54% bandwidth enhancement and 67% size reduction compared to the conventional hybrid ring is demonstrated at 2 GHz.

C. A dual-band non-harmonic branch-line coupler.

One embodiment of the invention is a dual-band non-harmonic branch-line coupler that uses four SMT chip lumped components CRLH-TLs instead of the λ/4 branches of the conventional branch-line. As a consequence, it can be designed for two arbitrary frequencies (not necessarily in a harmonic ratio) for dual-band operation, while the conventional branch-line characteristics repetitions are fixed at odd-harmonics of the design frequency.

Couplers described according to the present invention are suited for high-frequency radio-frequency (RF) signals at or above approximately 100 MHz, and more preferably in the microwave region at or above approximately 1000 MHz.

The invention is amenable to being embodied in a number of ways, including but not limited to the following descriptions. An embodiment of the invention can be generally described as a coupler apparatus for generating separate signal channels from a radio-frequency input, comprising: (a) an input line configured for receiving a high-frequency input signal; (b) a transmission line connecting the input line to an output line and to at least one separate signal channel; and (c) means for creating a left-handed relationship between phase and group velocities within at least a portion of the transmission line. The means of creating the left-handed (LH) relationship preferably comprises an artificial transmission line (TL) providing negative phase contribution. The LH contribution may be formed in any convenient manner, such as with lumped elements, microstrip line techniques, or other implementations described herein.

The coupler may be configured as a coupled-line backward coupler with two parallel LH-TLs. The coupler may also be configured as a hybrid ring coupler with at least one portion of the ring implemented with LH-TL providing a negative phase rotation. The coupler may be alternately configured as a branch-line coupler with microstrip line interconnecting the input with more than one output and in which at least one microstrip line includes an LH-TL portion.

One aspect of the invention can be generally described as a backward-coupler apparatus for generating separate signal channels from a radio-frequency (RF) input, comprising: (a) an input line configured for receiving a high-frequency RF input signal; (b) a first left-handed (LH) transmission line (TL) connecting the input line to an output line in which the LH-TL is configured for generating anti-parallel phase and group velocities; and (c) a second LH-TL terminating in a coupled output and an isolated output, the second LH-TL is positioned parallel to, and in sufficient proximity with, the first left-handed transmission line to generate a backward wave, preferably with a low loss, such as providing quasi-0 dB coupling.

One aspect of the invention can be generally described as a hybrid-ring coupler apparatus for generating separate signal channels from a radio-frequency input, comprising: (a) an input line configured for receiving a high-frequency input signal; (b) a first transmission line (TL) connecting the input line to an output line; and (c) a second TL connected between the input line and the output line to form a ring. In the hybrid ring at least a portion of the first TL or the second TL incorporates one or more left-hand (LH) TL sections in which anti-parallel phase and group velocities are generated.

One aspect of the invention can be generally described as a branch-line coupler apparatus for generating separate signal channels from a radio-frequency (RF) connection, comprising: (a) a plurality of high-frequency RF connections configured for receiving a high-frequency input signal; and (b) a plurality of branch lines interconnecting the plurality of high-frequency RF connections. The branch lines comprise a transmission line (TL) segment, and at least a portion of the branch lines incorporate a left-handed (LH) TL generating a phase advance with anti-parallel phase and group velocities.

Embodiments of the present invention can provide a number of beneficial aspects which can be implemented either separately or in any desired combination without departing from the present teachings.

An aspect of the invention is to provide high-frequency couplers and coupler implementation methods which result in couplers having increased utility and lower size constraints.

Another aspect of the invention is to provide coupler apparatus and methods which are applicable to microwave devices and systems.

Another aspect of the invention is the use of artificial composite right/left-handed transmission line technology to implement novel couplers which provide enhanced operating characteristics, such as efficiency, bandwidth, size, frequency response, and so forth.

Another aspect of the invention is to provide a coupled-line backward coupler which provides arbitrary tight/loose coupling.

Another aspect of the invention is to provide a coupled-line backward coupler which operates without the need of bonding wires.

Another aspect of the invention is to provide a coupled-line backward coupler comprising two parallel LH-TLs, such as implemented with microstrip techniques.

Another aspect of the invention is to provide a coupled-line backward coupler in which the microstrip implementation comprises interdigitated capacitors of value 2 C in series with stub inductors of value L.

Another aspect of the invention is to provide a coupled-line backward coupler in which the interdigitated capacitors of a first and second line are retained separated by a gap s, such as approximately s=0.3 mm (s/h=0.19).

Another aspect of the invention is to provide a coupled-line backward coupler which achieves arbitrary coupling levels, such as up to −0.5 dB, despite relatively wide gaps between the two TLs.

Another aspect of the invention is to provide a coupled-line backward coupler with a broad bandwidth, such as approximately 35%.

Another aspect of the invention is to provide a coupled-line backward coupler in which the tightness of the coupling can be varied by altering the gap between the TLs.

Another aspect of the invention is to provide a coupled-line backward coupler in which the coupling between the two LH-TLs of the coupler appears to exhibit a negative capacitance.

Another aspect of the invention is to provide a coupled-line backward coupler implemented with two separate LH-TLs retained in sufficient proximity to one another (gap), with input and output on a first line and an isolated and coupled output on the second TL.

Another aspect of the invention is to provide a compact enhanced-bandwidth hybrid ring coupler.

Another aspect of the invention is to provide a compact enhanced-bandwidth hybrid ring coupler exhibiting a −90° phase shift instead of the +270° phase shift of conventional hybrid ring couplers.

Another aspect of the invention is to provide a compact enhanced-bandwidth hybrid ring coupler which can be implemented to enhance bandwidth and reduce device size in relation to conventional hybrid rings.

Another aspect of the invention is to provide a hybrid ring coupler that can be implemented with microstrip, lumped elements, or more preferably a combination thereof.

Another aspect of the invention is to provide a hybrid ring coupler implemented with a ring that is closed by a CRLH-TL, such as three 30° LH-TL unit cells, or using CRLH-TL with three 35° LH unit cells alternating with three 5° RH unit cells.

Another aspect of the invention is to provide a hybrid ring coupler that can be implemented with a ring that is smaller than that of a conventional hybrid ring, such as $r_L$=14.6 mm compared with $r_R$=26.6 mm for the conventional ring coupler.

Another aspect of the invention is to provide a dual-band non-harmonic branch-line coupler, which allows a substantially arbitrary selection of the two frequencies (need not be harmonically related).

Another aspect of the invention is to provide a branch-line coupler comprising microstrip line interconnecting the inputs and outputs, upon which CRLH-TL elements are disposed, preferably in a discrete lumped device format (i.e., surface mount technology (SMT)).

Another aspect of the invention is to provide a branch-line coupler which offers a pair of −3 dB/quadrature bands at arbitrary frequencies $f_0$ and $\alpha f_0$, where $\alpha$ can be any positive real quantity.

Another aspect of the invention is a branch-line coupler in which the two operating frequencies can be obtained by tuning the phase slope of the different line sections.

Another aspect of the invention is a branch-line coupler having embedded CRLH TLs lines which may be shorter than the quarter-wavelength lines of a conventional branch-line coupler.

Another aspect of the invention is a branch-line coupler in which the phase response is dominated by the LH contribution at low frequencies, and dominated by the RH contribution at high frequencies.

Another aspect of the invention is a branch-line coupler in which CRLH-TL units cells within each branch line comprise series capacitors and shunt inductors on each side of which are RH-TL microstrip sections.

A still further aspect of the invention is to provide couplers that can be implemented separately, or incorporated within monolithic integrated circuits (MICs), microwave monolithic integrated circuits (MMICs), or similar integrated circuitry with microstrip techniques, lumped elements techniques, or a combination thereof.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 21. It will be appreciated that the apparatus may vary as to configuration and as to details of the parts, and that the method may vary as to the specific steps and sequence, without departing from the basic concepts as disclosed herein.

1. Introduction to Coupler Embodiments.

Figure 1A:
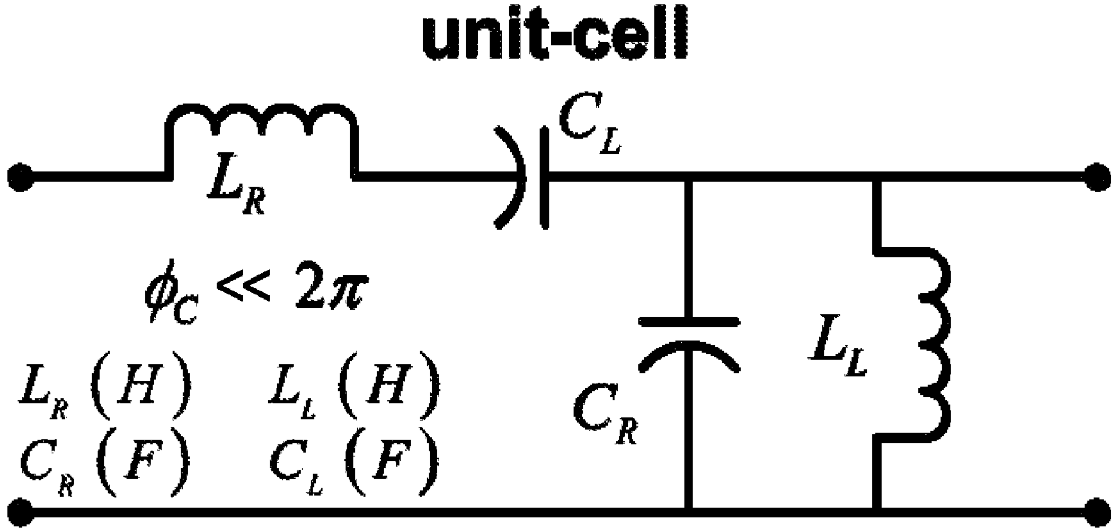
FIG. 1A is a schematic of an artificial CRLH-TL unit cell according to an embodiment of the present invention, showing a combination of series-L/shunt-C, series-C/shunt-L structure.
Figure 1B:
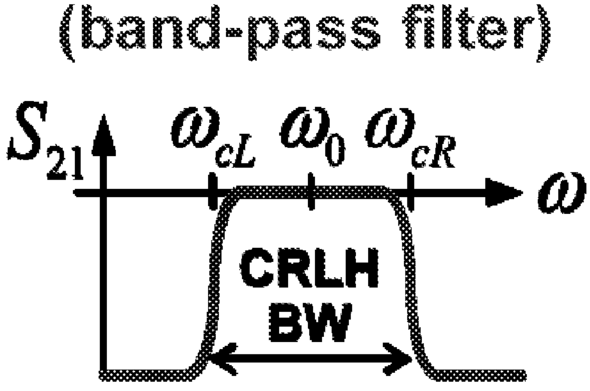
FIG. 1B is a graph of the pass-band of a CRLH device.

FIG. 1A and FIG. 1B illustrate the general characteristics of an artificial CRLH-TL. FIG. 1A depicts a unit cell of the CRLH-TL while FIG. 1B illustrates general bandpass filter characteristics. The pure RH-TL (low-pass) and LH-TL (high-pass) are respectively obtained by suppressing the elements of the opposite type. An essential requirement for the artificial CRLH-TL to mimic an ideal CRLH-TL (in its transmission-band) is that the electrical length of the unit cell be small, practically smaller than approximately $\pi/2$. Under this condition, the line can be considered as a uniform TL.

The following describes general defining equations for the LE implementation of an artificial CRLH-TL. The parameters of the unit cell shown in FIG. 1A are: cutoff frequencies $\omega_c$; transition frequency $\omega_0$; characteristic impedance $Z_0$; unit cell phase shift $\phi$ and group delay $t_g$. Component values for the complete ladder-network implementation of the TL include the variables $C_R'/L_R'$ $C_L'/L_L'$ which denote per-unit-length and times-unit-length capacitance/inductance of the artificial line, respectively. Equations defining operation of the LE unit cell include the following.

$$\omega_{cL}=\omega_{0L}/2,\ \omega_0=\sqrt{\omega_{0R}\omega_{0L}},\ \omega_{cR}=2\omega_{0R}\ (\infty \text{ periodic})$$

$$\text{with } \omega_{0R}=1/\sqrt{L_R C_R} \text{ and } \omega_{0L}=1/\sqrt{L_L C_L}$$

$$Z_{0R}=Z_{0L} \text{ (matching), with } z_{0R}=\sqrt{L_R C_R},\ z_{0L}=\sqrt{L_L C_L}$$

$$\phi_C=\phi_R+\phi_L \text{ (unit cell)}$$

$$\text{with } \phi_R=-\arctan[\omega\kappa_R/(2-(\omega/\omega_{0R})^2)]<0\text{: lag}$$

$$\text{and } \phi_L=-\arctan[\omega\kappa_L/(1-2(\omega/\omega_{0L})^2)]<0\text{: advance}$$

$$\text{and } \kappa_R=L_R/Z_{0R}+C_R Z_{0R},\ \kappa_L=L_L/Z_{0L}+C_L Z_{0L}$$

$$t_{gC}=t_{gR}+t_{gL} \text{ (unit cell)}$$

$$\text{with } t_{gR}=\kappa_R[2+(\omega/\omega_{0R})^2]\big/\left\{\kappa_R^2\omega^2+[2-(\omega/\omega_{0R})^2]^2\right\}$$

$$\text{with } t_{gL}=\kappa_L[1+2(\omega/\omega_{0L})^2]\big/\left\{\kappa_L^2\omega^2+[1-2(\omega/\omega_{0L})^2]^2\right\}$$

approximation of line length p with N unit cells:

$$\left.\begin{matrix} C_R=C_R'\cdot(p/N)L_R=L_R'\cdot(p/N) \\ C_L=C_L'\cdot(p/N)L_L=L_L'\cdot(N/p)\end{matrix}\right\},\ \left\{\begin{matrix} C_R',\ L_R',\ C_L',\ L_L' \text{ fct of} \\ \text{line implementation}\end{matrix}\right.$$

$$\longrightarrow \text{homogeneity/isotropy condition: } \phi_C<\pi/2$$

$$\phi_c^{tot}=N\cdot\phi_C,\ t_{gC}^{tot}=N\cdot t_{gC}$$

Figure 2:
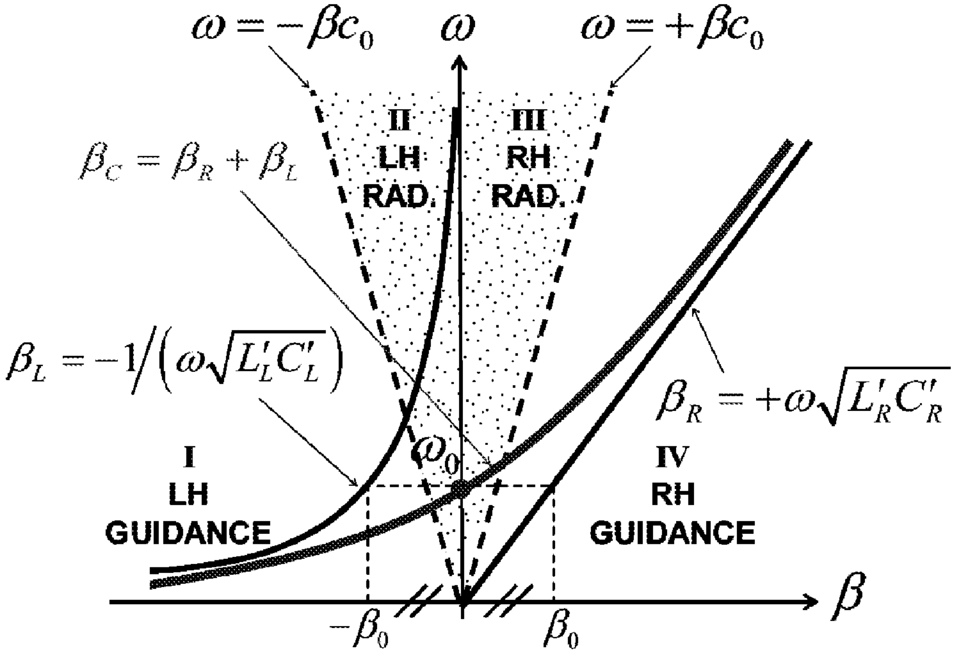
FIG. 2 is a dispersion diagram for an ideal CRLH-TL of FIG. 1.

FIG. 2 illustrates a dispersion relation for the ideal CRLH-TL depicted in FIG. 1A. The phase characteristic of the artificial implementation of the TL is similar, except for the low-frequency cutoff (due to the LH-TL) and the high-frequency cutoff (due to the RH-TL), which limits the frequency range of operation to the bandwidth of the resulting band-pass filter.

It should be noted that below frequency $\omega_0$ the CRLH-TL is LH providing anti-parallel phase/group velocities, while above frequency $\omega_0$ the dominant mode is RH with parallel and same sign phase/group velocities. The curves $\omega=\pm\beta c_0$ represent the air lines: if $\omega>|\beta c_0|$, represented by the shaded area of FIG. 2, and the structure is open in the direction y perpendicular to the direction of the line, then $k_y=\sqrt{\omega^2-(\beta c_0)^2}$ is real in the field dependence $\exp(-jk_y y)$ and some amount of leakage/radiation occurs.

Figure 3A:
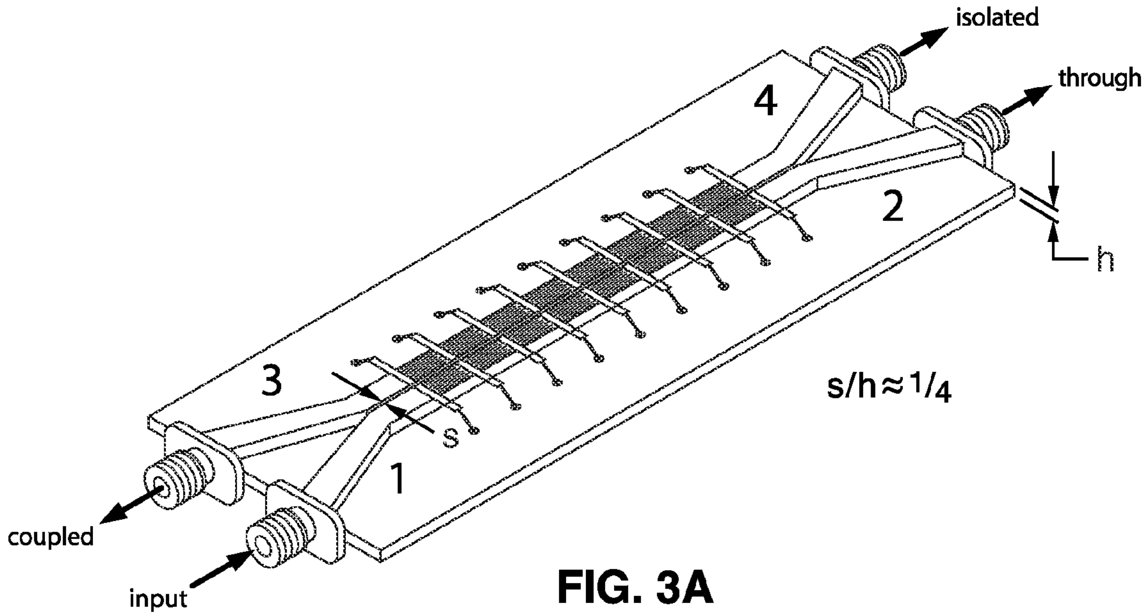
FIG. 3A is an image of an RH-LH quasi-0 dB coupled-line backward coupler according to an embodiment of the present invention.
Figure 3B:
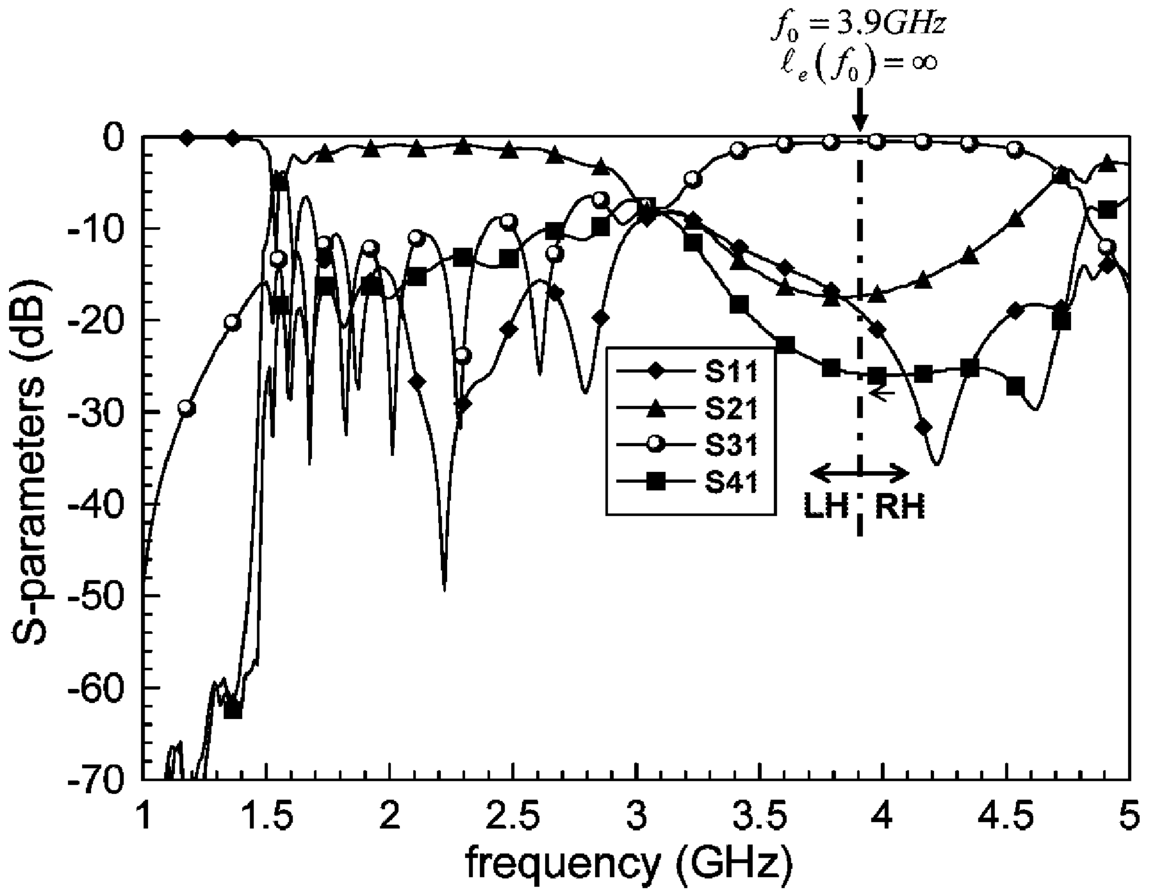
FIG. 3B is a graph of measured performance of the RH-LH coupler of FIG. 3A across a range of frequencies.

FIGS. 3A through 3B illustrate the CRLH backward coupled-line coupler. In FIG. 3A it can be seen that each microstrip CRLH-TL is composed of the periodic repetition of a unit cell constituted by a series interdigital capacitor and a shunt stub inductor. For example the fingers extend from each shunt stub inductor to interleave with fingers extending from another shunt stub inductor. FIG. 3B is a graph of measured performance of the RH-LH quasi-0 dB coupled-line backward coupler. Called out in FIG. 3A are spacing s and height h as well as ratio s/h. Spacing for the coupler is s=0.3 mm, resulting in a low ratio of gap s to the height (thickness) h of the substrate (s/h=0.19). The range of s/h extending up to at least approximately a value where s/h=¼. The transition frequency is $f_0$=3.9 GHz. Values $\beta$ and S represent propagation constant and Poynting vector, respectively, in each of the two lines. The substrate of this embodiment is preferably RT/Duroid 5880, (although other materials may be utilized), having $\epsilon$=2.2 and h=61 mil. The same s/h provides less than −10 dB coupling in the conventional case.

An insertion loss smaller than 0.6 dB (quasi-0 dB) is observed in the broad frequency range of 3.3 GHz to 4.7 GHz, which corresponds to a −3 dB bandwidth of 35%. It was verified that looser coupling can be easily obtained by simply increasing the gap between the lines and/or reducing the number of unit cells. For instance, a −3 dB coupler was implemented with −3.3±0.4 dB backward/through-coupling with return loss smaller than 18 dB, isolation better than 20 dB over the 3.1 GHz to 4.5 GHz range (37% bandwidth). Even/odd mode and lumped-element analysis reveal a physical behavior significantly different from that of the conventional case: $Z_{Oe}$ is smaller than $Z_{OO}$ below 3.7 GHz around the estimated transition frequency $f_0$ (see FIG. 2) and larger above that frequency, which suggests magnetic coupling below $f_0$ and electric coupling (as in the conventional case) above $f_0$. In addition, the coupling capacitance between the two lines appears to be negative, suggesting a completely novel phenomenon. Similar performances, although related to different physical effects, were also obtained by coupling a conventional microstrip line with a CRLH.

Conventional hybrid rings, often referred to as rat-race couplers, provide advantages but also have the shortcomings of narrow bandwidth and a large size. However, a −90° lumped-element CRLH-TL ring overcomes those shortcomings by supporting size reduction by the use of SMT chip components, and more importantly, provide dramatically enhanced bandwidth as a result of the DC offset and ultramild slope of the CRLH-TL.

Figure 4A:
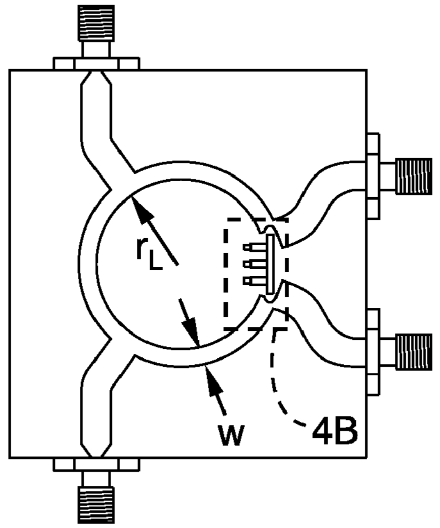
FIG. 4A is an image of an enhanced-bandwidth CRLH hybrid ring coupler according to an aspect of the present invention.
Figure 4B:
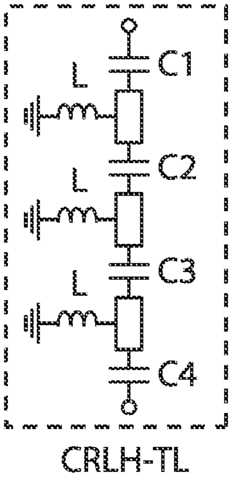
FIG. 4B is a schematic of lumped components with the CRLH hybrid ring coupler of FIG. 4A.
Figure 4C:
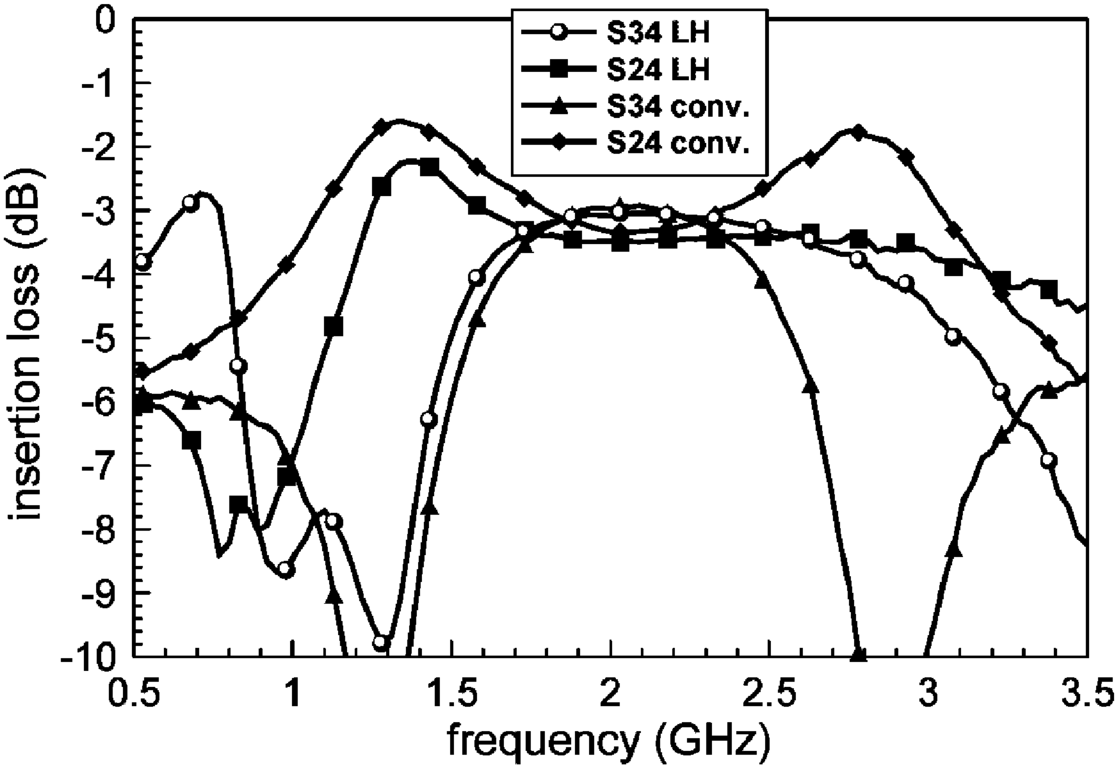
FIG. 4C is a graph of measured performance of the CRLH hybrid ring coupler of FIG. 4A across a range of frequencies.

FIG. 4A through 4C illustrate the CRLH hybrid ring according to the present invention. In the image of FIG. 4A it can be seen that the CRLH-TL is implemented in SMT chip components and short microstrip interconnects. The replacement of the +270° line section by a −90° CRLH-TL leads to a shorter absolute electrical length, and therefore broader bandwidth. However, it should be appreciated that the bandwidth enhancement is primarily in response to the fact that the −90° CRLH-TL presents a slope very close to that of the +90° (RH) line sections, as it can be seen in FIG. 2, while the +270° (RH) conventional section has a clearly distinct slope. FIG. 4B is a schematic for the hybrid ring. FIG. 4C is a graph of insertion loss over a range of frequencies from 0.5 GHz to 3.5 GHz. A 54% bandwidth enhancement and 67% size reduction compared to the conventional ring is observed at 2 GHz. Testing of the embodiment provided verification that both the phase balance and isolation is provided over a correspondingly broader bandwidth than that obtained from a conventional hybrid ring.

Conventional branch-line couplers (or quadrature hybrids) are characterized by repetition of their coupling characteristics at odd harmonics of the design frequency. Since it is unlikely that a dual-band application would require exactly $f_0$ and 3 $f_0$, conventional couplers are therefore essentially limited in a practical sense to single-band operation at $f_0$. By contrast, the invented branch-line coupler has the versatility of offering a pair of −3 dB/quadrature bands at arbitrary frequencies ($f_0$ and $\alpha f_0$, where $\alpha$ can be any positive real quantity).

Figure 5A:
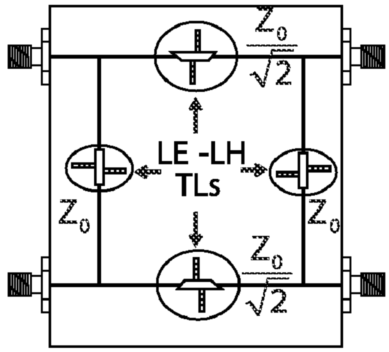
FIG. 5A is an image of an dual-band arbitrary frequency branch-line coupler according to an aspect of the present invention.
Figure 5B:
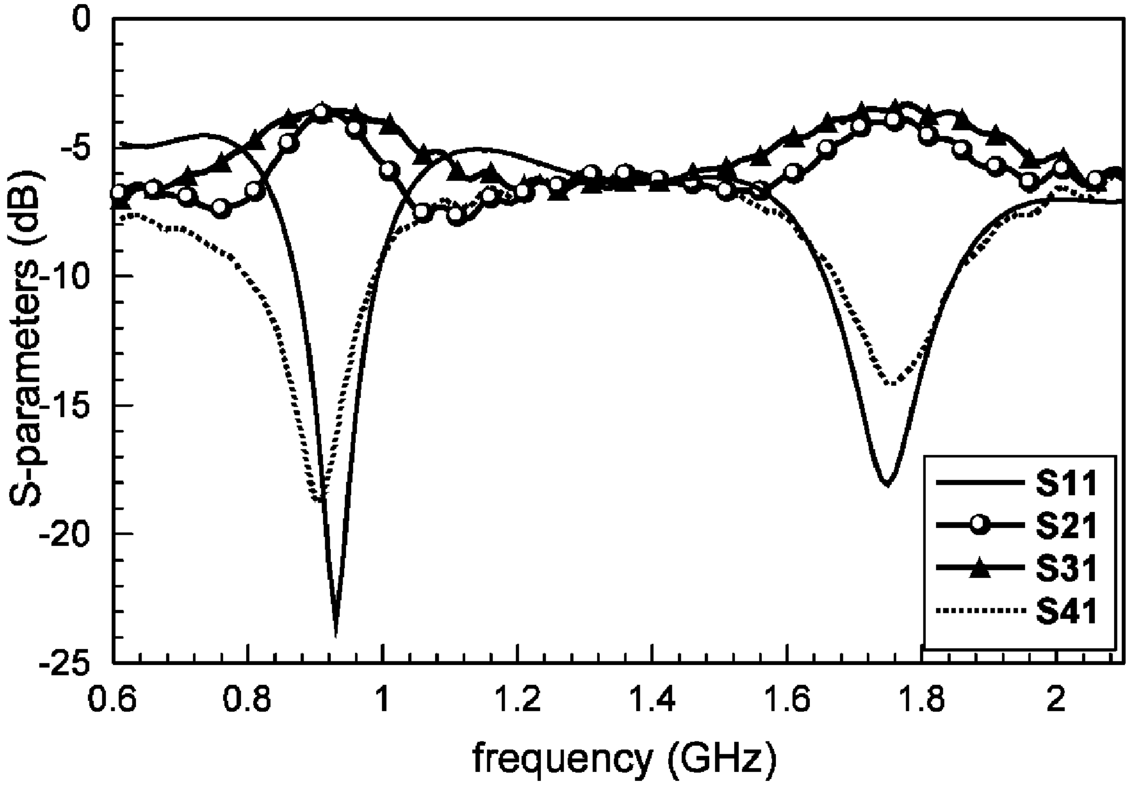
FIG. 5B is a graph of measured performance of the dual-band arbitrary frequency branch-line coupler of FIG. 5A across a range of frequencies.

FIGS. 5A and 5B illustrate a CRLH branch-line coupler embodiment configured for the two arbitrary design frequencies of 920 MHz and 1740 MHz. The implementation of the CRLH-TLs is also preferably in an SMT chip component form, as seen in FIG. 5A, or similar discrete lumped device format. The underlying principle can be understood from FIG. 2, with the additional degree of freedom provided by the DC-offset due to the LH contribution allowing an arbitrary pair of frequencies (at 90° and 270°) to be intercepted by the phase curve of the CRLH-TL. The measured bandwidths of the two bands are 12% and 9%, respectively as shown by the graph of FIG. 5B.

In the following sections the above embodiments are described with greater particularity.

2. Coupled-Line Backward Coupler with Arbitrary Tight/Loose Coupling.

A novel broadband left-handed (LH) coupled line backward coupler with arbitrary coupling level is presented. This coupler can be composed of two LH transmission lines (TL) constituted of series interdigital capacitors and shunt-shorted inductors, or LH-TL and a RH-TL, or otherwise with portions of at least one parallel TL comprising a LH-TL section. A preferred embodiment of this aspect of the invention which comprises two back-to-back LH-TLs as described herein.

A quasi 0-dB implementation of the backward LH-TL coupler is demonstrated by simulation and measurement results, and shown to exhibit a bandwidth of 35% despite the relatively wide line-gaps of 0.3 mm. An even/odd modes analysis is presented to explain the working principle of the component. A 3 dB-quadrature implementation, with 37% bandwidth, is also demonstrated. Finally, parametric results illustrate the versatility of the LH coupler and its strongly enhanced backward coupling compared with the conventional coupled-line coupler.

A well-known problem of conventional microstrip parallel-coupled couplers is the difficulty in achieving tight backward-wave coupling with them (e.g., 3-dB) because of the excessively small lines-gaps required. Alternative components include non-coupled-line couplers such as branch-line or rat-race; however, these couplers are inherently narrowband (<15% bandwidth) circuits. The Lange coupler is a partial solution widely used in the monolithic microwave integrated circuit (MMIC) industry for broadband 3-dB coupling, but it has the disadvantage of requiring cumbersome bonding wires.

Recently, the field of metamaterials has emerged, which includes left-handed (LH) structures in which phase and group velocities exhibit opposite signs, and which correspond to negative refractive index materials. In general, metamaterials comprise the group of artificial materials having properties not found in nature. The concept of LH-TL described herein paves the road for a diverse range of novel microwave components (e.g., couplers, phase shifters, baluns, and the like), as well as circuits, reflectors, antennas and so forth.

This aspect of the present invention comprises a combination of two LH-TLs into a novel symmetric coupled-line coupler, which can provide arbitrary loose/tight coupling levels over a broad bandwidth and quadrature through/coupled outputs, without requiring bonding wires as taught by the Lange coupler.

FIG. 3A shows a prototype of the proposed coupler, with performance shown in FIG. 3B. This coupler is composed of two parallel identical LH-TLs, consisting of the periodic repetition of a T-network symmetric microstrip unit cell including series interdigital capacitors of value 2C and one shunt shorted-stub inductor of value L. By way of example and not limitation, the coupler in the figure comprises two 9-cell LH-couplers printed on a RT-Duroid 5880 substrate (h=2.2 mils). The gap between the lines is s=0.3 mm (s/h=0.19). The unit cell of each LH-TL (1-2 and 3-4) consists of a series interdigital capacitor 2C (2C=2.4 pF at 3 GHz) (after series-combination, 2C at both ends and C everywhere else) and of a shunt shorted-stub inductor L (L=6.5 nF at 3 GHz). The impedance of the coupler is given by the following.

$$Z_0=\sqrt{LC}=75\Omega$$

The resulting ladder-network for each line is a high-pass filter equivalent to an artificial (non-existing in nature) LH-TL in its pass-band if the electrical length of the unit cell, given by the following.

$$\phi=-\arctan\{\omega(L/Z_0+CZ_0)/[1-2(\omega/\omega_0)^2]\} \quad (1)$$

In the above equation $\omega_0=1/\sqrt{LC}$ is much smaller than the wavelength, (ideally $\phi<<\pi/2$). In the case of FIGS. 3A, 3B the unit cell length is about $\lambda/10$ at 3 GHz. Under this condition, the structure behaves as a uniform/homogeneous TL, and the physical unit cell approximates the infinitesimal model of the dual of the conventional TL, in which L and C have been swapped. As a consequence, the line exhibits the negative-hyperbolic phase response and the corresponding anti-parallel phase/group velocities given by the following.

$$\beta=-1/(\omega\sqrt{L'C'})\ (L' \text{ in } H\cdot m,\ C' \text{ in } F\cdot m) \quad (2)$$

$$v_\phi=-\omega^2\sqrt{L'C'}\ v_g=+\omega^2\sqrt{L'C'} \quad (3)$$

These equations are characteristic of backward or LH waves, while the characteristic impedance is still given by $Z_0=\sqrt{L'C'}=\sqrt{LC}$ in the lossless case. In contrast to most structures described previously in literature, this LH structure can have a low insertion-loss over a broad bandwidth with moderate dispersion.

Figure 6:
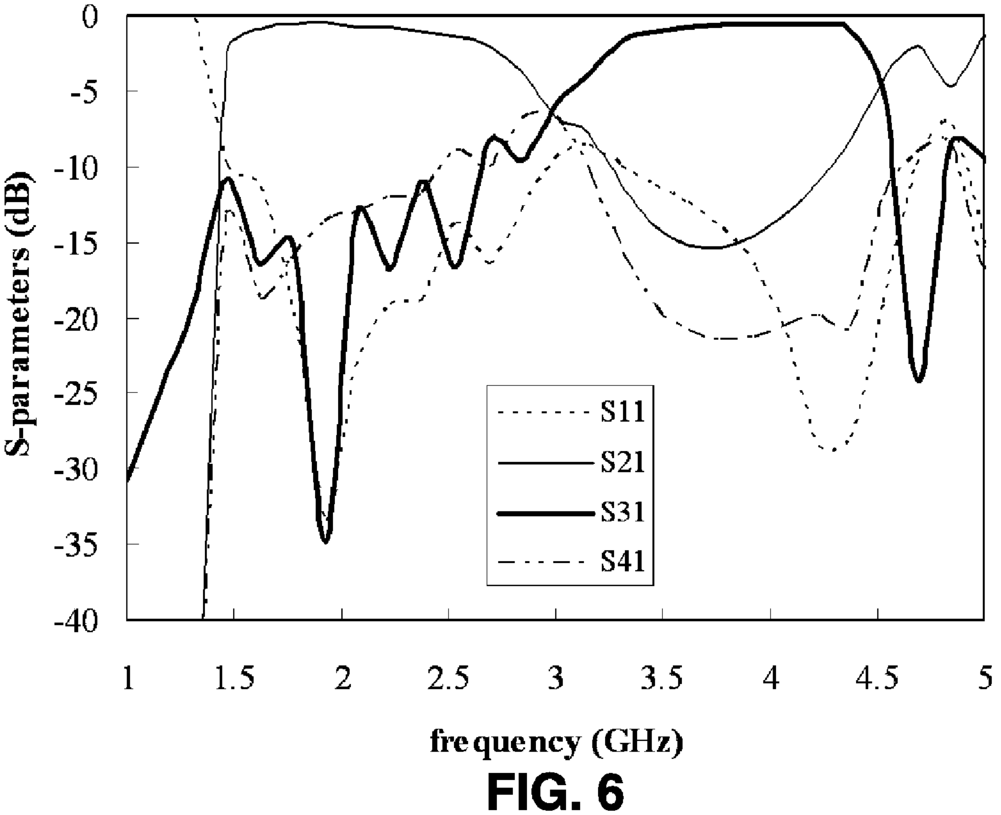
FIG. 6 is a graph of simulated S-parameters for the backward coupler of FIG. 3A.
Figure 7:
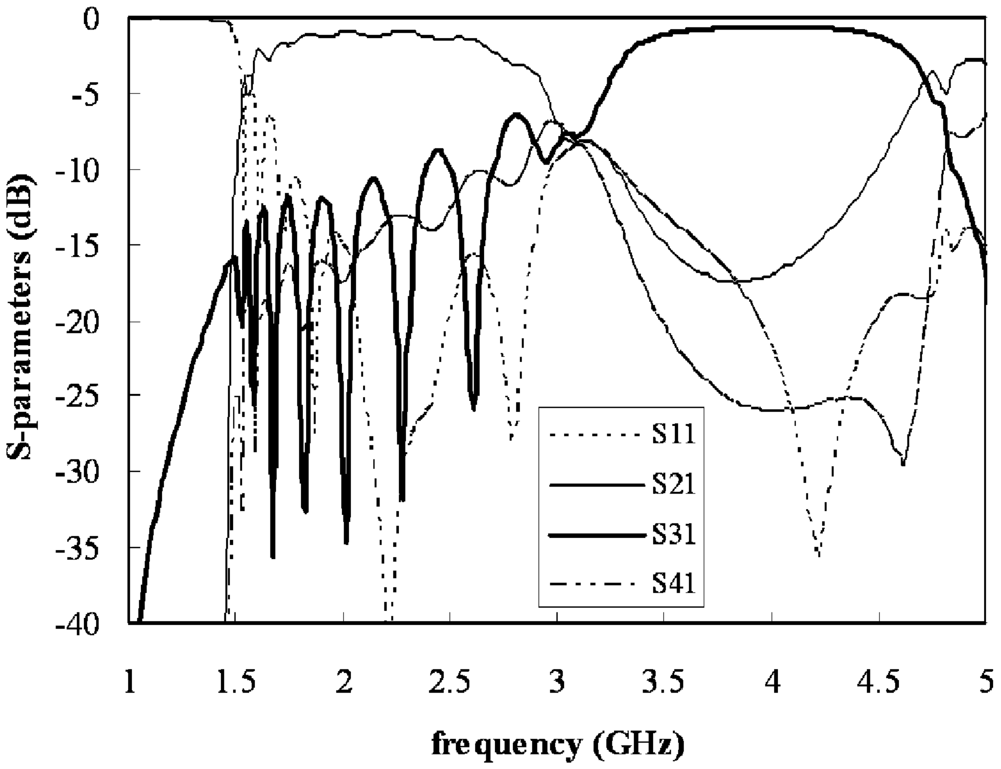
FIG. 7 is a graph of measured S-parameters for the backward coupler of FIG. 3A.

The combination of two such LH-TLs into the coupler configuration shown in FIG. 3A provide strongly enhanced backward-coupling. This is demonstrated in the graphs of FIGS. 6 and 7, showing S-parameters obtained by full-wave simulation (Ansoft-Ensemble method) in FIG. 6, and obtained by measurement in FIG. 7 for the quasi-0 dB backward coupler of FIG. 3A. Insertion loss is less than 0.6 dB in the frequency range from 3.3 GHz to 4.7 GHz, which corresponds to a −3 dB fractional bandwidth of 35%. In comparison, the conventional $\lambda/4$ microstrip coupler provides a coupling of only −11.8 dB for the same substrate parameters and gap (s/h=0.19). The results also reflect the high-pass nature of the structure, with a cutoff of around 1.4 GHz obtained for the infinitely-periodic LH-TL, corresponding to the following formula.

$$f_c=1/(4\pi\sqrt{LC}) \quad (4)$$

The frequency dependence of the shunt shorted-stub inductor, $L(\omega)=(Z_0/\omega)\cdot\tan(\beta d)$ where ($L\triangleright 2.4$ nH at 1.5 GHz) must be taken into account in this calculation. A through ($S_{21}$ $\triangleright$ 0 dB) propagation band extending from 1.5 GHz to 2.5 GHz, which may be used in dual-band applications, is also observed in FIG. 6 and FIG. 7.

Figure 8:
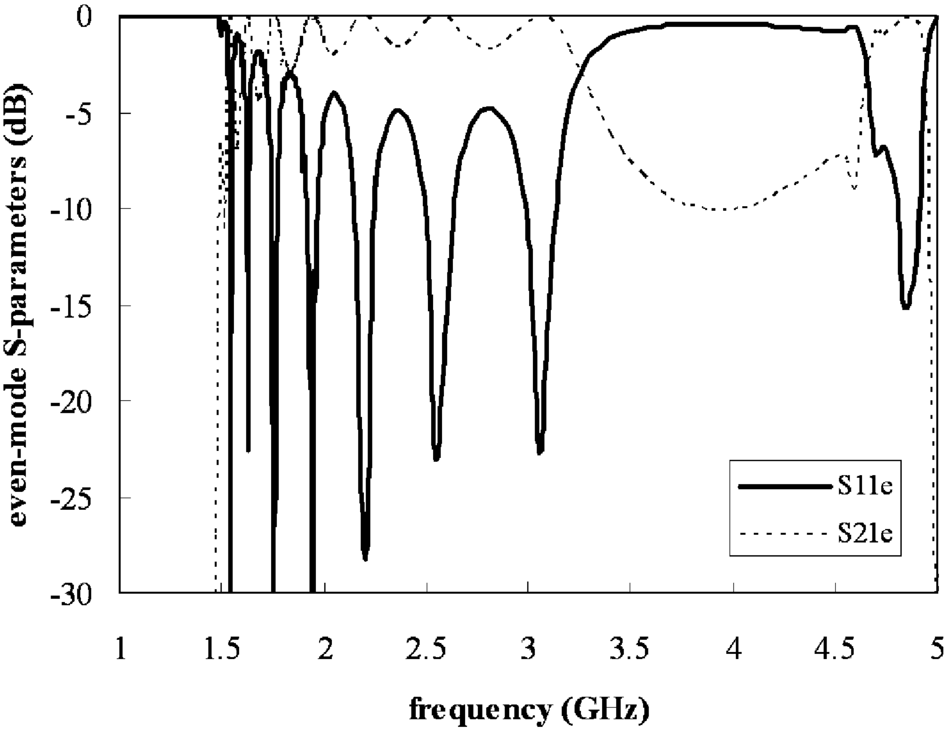
FIG. 8 is a graph of Sonnet-EM simulated even-mode S-parameters for the backward coupler of FIG. 3A.
Figure 9:
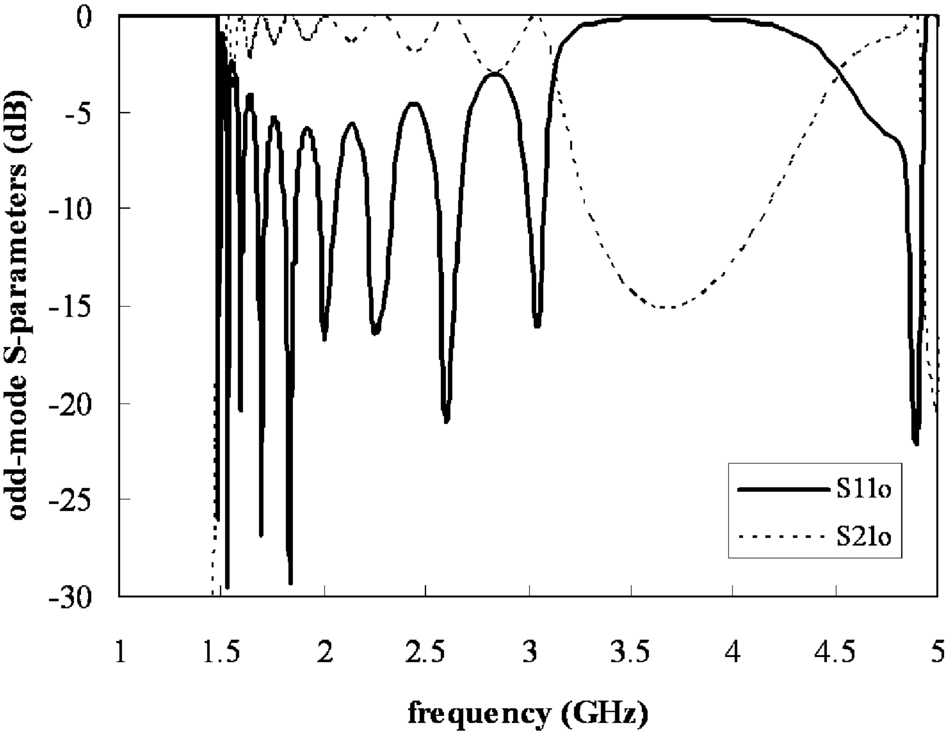
FIG. 9 is a graph of Sonnet-EM simulated odd-mode S-parameters for the backward coupler of FIG. 3A.

The even and odd mode S-parameters of the coupler of FIG. 3A were computed by the Sonnet full-wave simulator, and are shown in FIG. 8 and FIG. 9, respectively. In the bandwidth of the backward coupler (3.3 GHz to 4.7 GHz), the even/odd return losses are very flat and close to 0 dB. This is the reason through transmission is very small and backward coupling can be close to 0 dB in the coupler.

Figure 10:
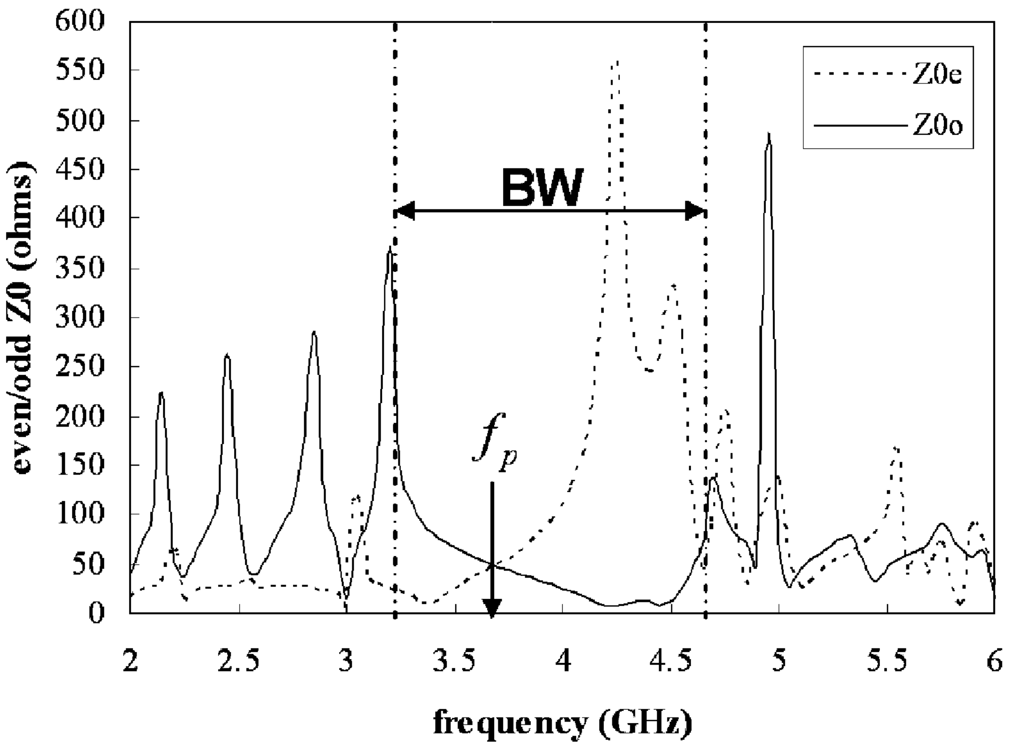
FIG. 10 is a graph of characteristic impedances computed from the even/odd S-parameter of FIG. 8 and FIG. 9 for the backward coupler embodiment shown in of FIG. 3A.

FIG. 10 shows the even/odd characteristic impedances $Z_{0e}/Z_{0o}$ computed from the even/odd S-parameters, using the following general formula.

$$Z_{0i}=\sqrt{(\Pi_i-1)/(\Pi_i+1)},\ (i=e,o) \quad (5)$$

It can be seen that $Z_{0o}>Z_{0e}$ in the first part of the range, while $Z_{0e}>Z_{0o}$ in the second part of the range. In their most general form, also holding for LH lines, the characteristic impedances in a symmetrical coupled-line coupler are given by the following.

$$Z_{0e}=\sqrt{(L'+2L_m')/C'} \text{ and } Z_{0o}=\sqrt{L'/(C'+2C_m')} \quad (6)$$

In Eq. (6) $C_m'/L_m'$ are the per-unit-length mutual capacitance and inductance, respectively, between the two lines, and $C_m'/L_m'$ here represent the times-unit-length elements of the LH-TL. In Eq. (6), $L_m'$ is a negative quantity since the currents flow in opposite directions in the two lines, but, while it can usually be neglected in the conventional coupler, it appears to be dominant below the $Z_{0e}/Z_{0o}$ crossing frequency $f_p$=3.7 GHz in the proposed coupler. This response suggests that the operating range of the LH coupler can be divided into two parts delimited by $f_p$ in the lower part, coupling is essentially of magnetic nature with $L_m'$ negative and $|L_m'|>L_{lim}$ in which the following relation holds.

$$L_{lim}=0.5\cdot[L'C'/(C'+2C_m')-L'] \quad (7)$$

However, in the higher part, it is essentially of electric nature with $|L_m'|<L_{lim}$ as in the conventional case. It was verified that conventional relations as given by the following equation.

$$S_{11o}=-S_{11e},\ S_{22o}=-S_{11e},\ S_{21o}=+S_{21e} \quad (8)$$

This relation is satisfied above $f_p$, but not below $f_p$, which further confirms that the working principle below $f_p$ is very different from that of the conventional case.

$$C_{BWD}=\frac{jk\sin\beta l}{\sqrt{1-k^2}\cos\beta l+j\sin\beta l}, \quad (9)$$
$$\text{with } k=(Z_{0e}-Z_{0o})/(Z_{0e}+Z_{0o})$$

It should be noted that the usual formula, given above for backward coupling does not apply here, because this formula is based on the relation $Z_{0e}\cdot Z_{0o}=Z_0^2$, which is clearly not satisfied according to FIG. 10. It is therefore not paradoxical that we can have a high level of coupling at $f_p$=3.7 GHz despite the fact that $Z_{0e}=Z_{0o}$.

Figure 11:
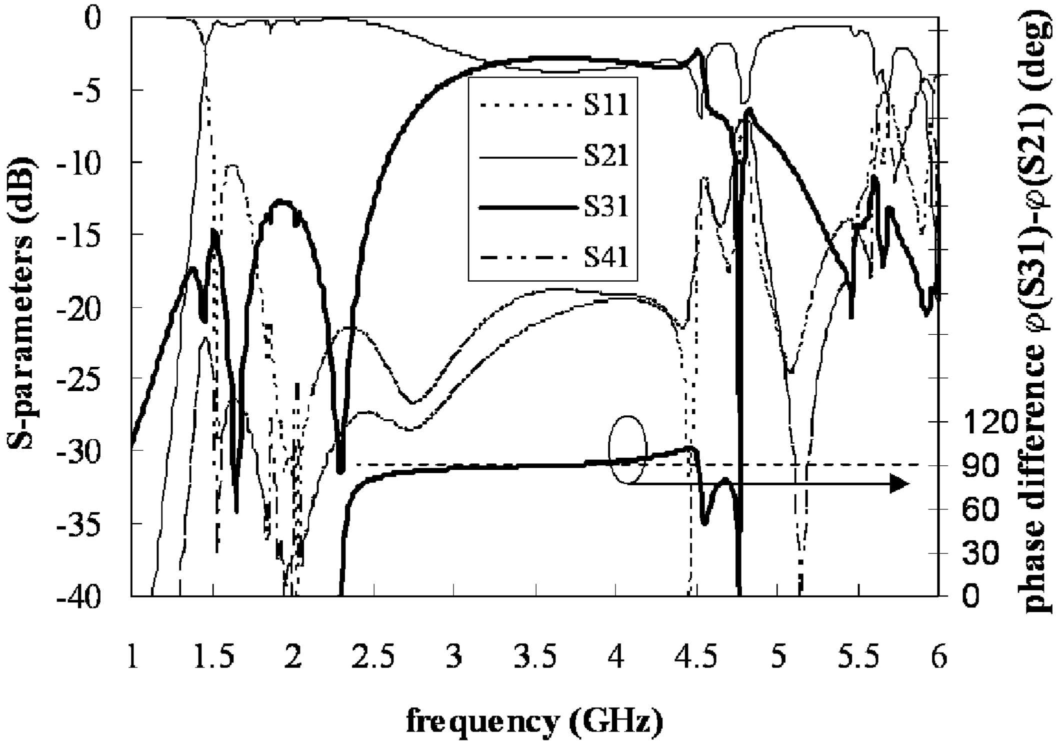
FIG. 11 is a graph of simulated phase characteristics for a 3 dB unit cells backward coupler having different gap than the coupler of FIG. 3A.

FIG. 11 depicts the results for a 3-dB implementation of the LH coupler, with a gap of 0.4 mm between the lines, which corresponds to a gap of s/h=0.25. For this gap, the coupling level of the conventional coupled-line coupler is around −12 dB. The physical length of the coupler 25 mm, which represents $0.4\lambda_g$ is the guided wavelength of the corresponding conventional coupler. It should be noted that the size of the 3 dB coupler can be decreased by reducing the gap. For instance, using only 2 unit cells with s=0.05 mm results in a 3 dB coupler of length $0.3\lambda_g$.

The performance of the 3-dB coupler is as follows: −3.3±0.4 dB backward/through coupling, return loss smaller than 18 dB and isolation better than 20 dB over the 3.1 GHz to 4.5 GHz range (37% fractional bandwidth). The phase difference between the coupled and through ports is 90.5°±1.5° across the 3.1 GHz to 4.2 GHz frequency range.

Demonstrations of a quasi-0 dB LH-coupler, and a 3 dB LH-coupler according to the present invention were presented above. It should be appreciated that arbitrary coupling level (i.e., from around 0.2 dB) can be achieved by varying the gap s between the lines or the number of unit cells N. Sonic benchmark results for the achievable coupling levels of the LH coupler versus s are shown in Table 1, where the coupling levels of the conventional coupled-line coupler with corresponding gaps are also shown for comparison.

The isolation of the backward coupler is typically better than 20 dB. It can be seen that the proposed LH coupler can achieve arbitrary tight/loose coupling levels with line-gaps readily realizable even when implemented using traditional microstrip techniques.

The strong enhancement of coupling shown here suggests the possibility that the attenuation factor α in the structure may be a negative quantity, which would correspond to an enhancement ("amplification") of the evanescent waves through which the coupling process occurs.

A novel LH backward-wave coupler was presented that has been shown to be well-suited for arbitrary loose/tight coupling levels despite relatively large lines-gap (typically s/h>1/5), which provides a solution to the impractically small gaps required in providing tight-coupling using conventional coupled-line couplers. The proposed coupler was also shown to exhibit a broad bandwidth, typically larger than 35%. Embodiment of this aspect of the invention were described for both a quasi-0 dB and a quadrature 3 dB implementation, although it will be appreciated that the teachings can be applied to couplers with a wide range of bandwidths and other characteristics.

An even/mode analysis of the coupler was put forth with an explanation based on alternating magnetic and electric coupling in the backward band being suggested. In addition to providing arbitrary coupling levels over a broad bandwidth, the backward coupler according to this aspect of the present invention can be designed within a physical size similar to that of the conventional coupler, and does not require bonding wires in contrast to the Lange coupler.

3. Compact Enhanced-Bandwidth Hybrid-Ring Coupler.

A novel compact enhanced-bandwidth hybrid ring is described using a left-handed (LH) transmission line (TL). The −90° LH-TL is used replacing the 270° TL of the conventional hybrid ring. The proposed hybrid shows a 54% bandwidth enhancement and 67% size reduction compared to the conventional hybrid at 2 GHz. The working principle is explained and the performances of the components are demonstrated by measurement results.

Left-handed (LH) materials, which are characterized by simultaneously negative ϵ and μ have recently attracted significant attention. However, the first approaches to using LH materials were mainly based on an analogy with plasmas, which naturally resulted in resonant-type structures not suitable for practical microwave applications because of their excessive loss and narrow bandwidth.

Recently, a transmission line (TL) approach of LH-materials and practical implementations of them were proposed in different applications. The low insertion loss and broad bandwidth of the LH-TL make it an efficient candidate for new microwave frequencies. As a consequence of their negative β, LH-TLs exhibit phase advance, instead of phase lag which is exhibited by conventional right-handed (RH) TL. This phase characteristic can lead to new designs for many microwave circuits such as antennas and couplers. This aspect of the present invention describes a hybrid ring with a LH-TL section, which demonstrates the effectiveness of LH-TL for bandwidth enhancement within the present invention.

The hybrid ring (or rat-race) is a 180° hybrid which represents a fundamental component in microwave circuits. It can be used as an out-of-phase or in-phase power divider with isolated output ports. In view of these characteristics, the 180° hybrid is widely used in balanced mixers and power amplifiers. The hybrid ring is useful in monolithic integrated circuits (MICs) or monolithic microwave integrated circuits (MMICs) because it can easily be constructed in planar form.

The shortcomings of hybrid rings are their narrow bandwidth and large size. There have been numerous approaches to achieve broad band and small size. The use of lumped-elements has been one approach to reducing the size, however, it is difficult to achieve broad bandwidth. A broad bandwidth hybrid ring was proposed using a CPW-slotline configuration; however, CPW and slotline are not suitable for general MIC applications. The hybrid ring of the present invention, which utilizes LH-TL, provides a workable approach to realizing acceptably small size and relatively broad bandwidth with conventional radio-frequency circuit processes.

Figure 12A:
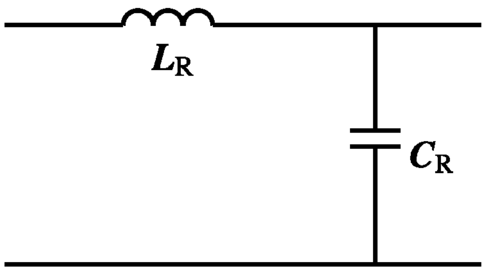
FIG. 12A-12B are unit cell equivalent circuits for a right-handed (RH) transmission line (TL) and left-handed (LH) TL.
Figure 12B:
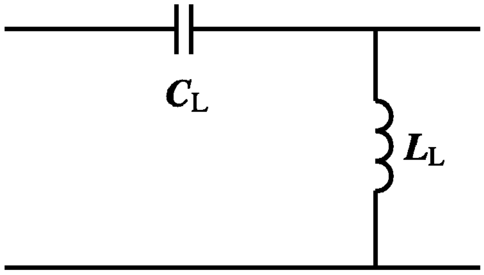

FIG. 12A and FIG. 12B illustrate unit cell equivalent circuit models for the RH (FIG. 12A) and LH (FIG. 12B) TLs. The LH-TL is the electrical dual of the conventional RH-TL, in which the inductance and capacitance have been interchanged. In the LH-TL, the wavenumber $\beta_L$, the characteristic impedance $Z_{0L}$, the cut-off frequency $\omega_{cL}$, and the insertion phase-rotation $\phi_L$ are given by Eq. (10) through Eq. (13), respectively. The LH-TL is characterized by a negative $\beta_L$ and the positive $\phi_L$. These unique features may be exploited in the design of new types of microwave circuits.

$$\beta_L = -1/\left(\omega\sqrt{L_L C_L}\right) \tag{10}$$

$$Z_{0L} = \sqrt{L_L/C_L} \tag{11}$$

$$\omega_{cL} = 1/\left(2\sqrt{L_L C_L}\right) \tag{12}$$

$$\varphi_L = -\arctan\left[\frac{\omega(L_L/Z_0 + C_L Z_0)}{1-2(\omega/\omega_{cL})^2}\right] > 0 \tag{13}$$

The conventional hybrid ring consists of three 90° RH-TLs and one 270° RH-TL. The 270° RH-TL uses half of the area of the hybrid ring component and provides a narrow bandwidth as a consequence of the frequency dependence of its insertion phase, which is three-times larger than that of a 90° RH-TL. Since 270° phase rotation is electrically equivalent to −90° phase rotation, it has been appreciated in the present invention that we may replace the 270° RH-TL into a 90° LH-TL. In contrast to the RH-TL, the LH-TL can be made small and has a mild frequency dependence of insertion phase around the frequency of interest. Thus a hybrid ring with a −90° LH-TL instead of a 270° RH-TL can be implemented in a smaller size while exhibiting a broader bandwidth. It should be noted that some amount of parasitic RH contribution is intrinsically included in the practical implementation of a LH-TL, which makes its frequency dependence even milder than that of the ideal LH-TL. In general, a TL including both LH and RH contributions is called a CRLH (Composite Right/Left Handed) TL.

Figure 13A:
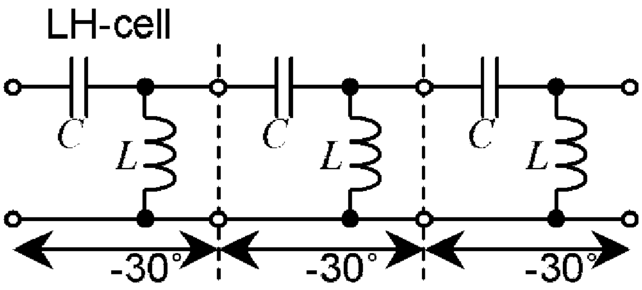
FIG. 13A is a schematic of a LH TL having a three-cell configuration according to an aspect of the present invention.
Figure 13B:
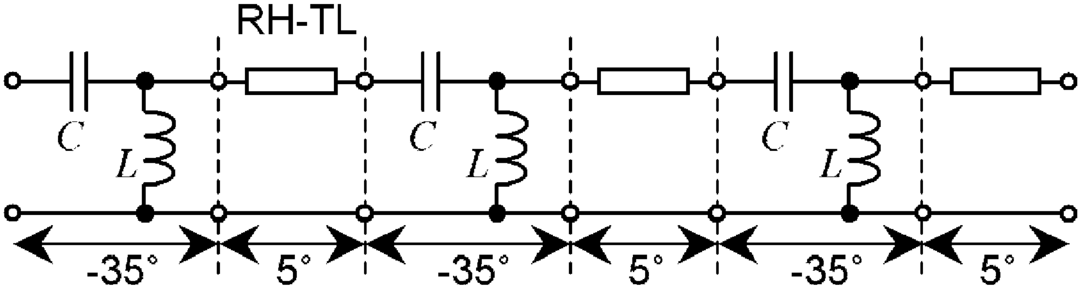
FIG. 13B is a schematic of a CRLH TL having a three-cell combined RH-LH configuration according to an aspect of the present invention.
Figure 14:
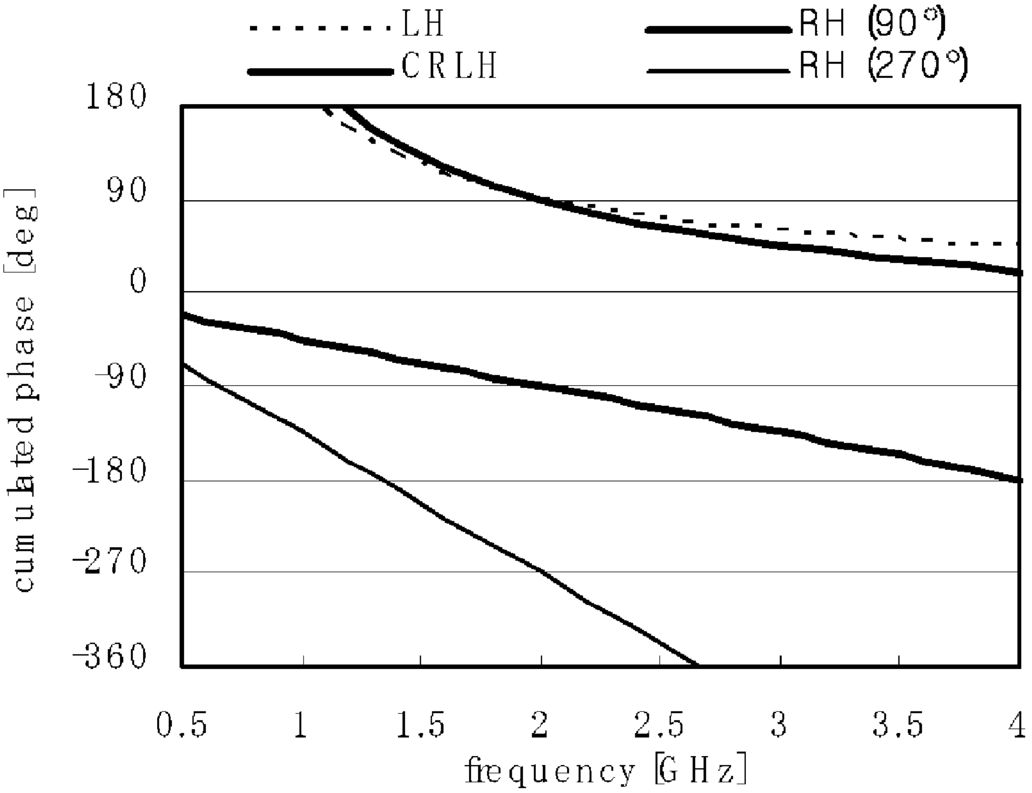
FIG. 14 is a graph of insertion phase for the TLs of FIGS. 13A and 13B according to an aspect of the present invention.

FIG. 13A and FIG. 13B show 3-cells configurations of an LH-TL and a CRLH-TL. To achieve −90° phase rotation, the LH-TL of FIG. 13A includes three −30° LH-cells, and the CRLH-TL of FIG. 13B has three −35° LH-cells which include three 5° RH-TLs. The frequency dependences of insertion phase for these LH-TLs and CLRH-TLs were calculated by using Eq. (13) and are shown in FIG. 14 with the calculated results for the 90° RH-TL and 270° RH-TL.

Figure 15:
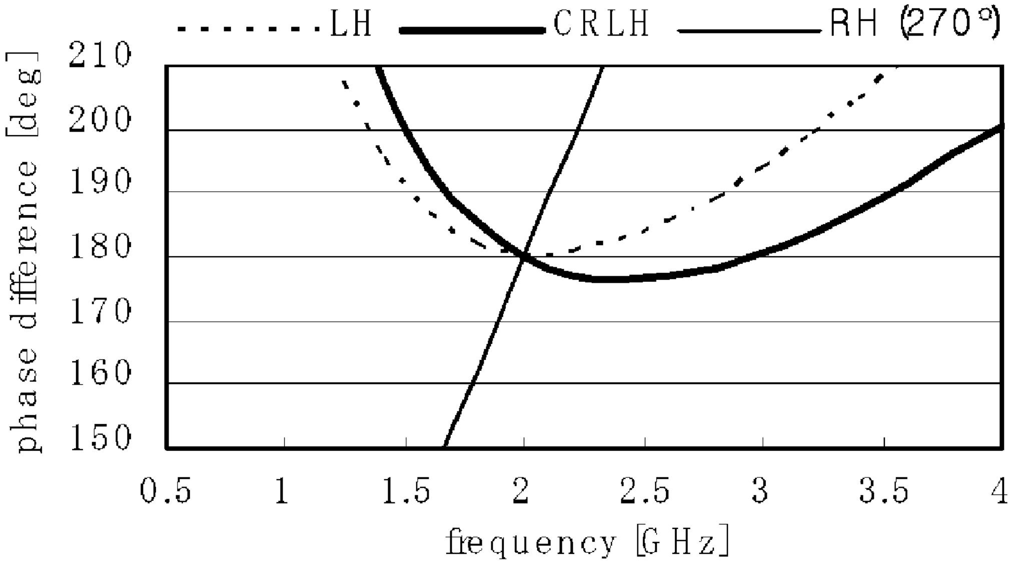
FIG. 15 is a graph of insertion phase differences for the TLs of FIGS. 13A and 13B according to an aspect of the present invention.

The capacitances C and inductances L in the unit cells were adjusted to make the insertion phase −90° at 2 GHz and the characteristic impedance, given by Eq. (11), 70.7Ω. The resulting values for C and L are (a) 2.2 pF, 11.2 nH, and (b) 1.9 pF, 9.7 nH. It is clearly seen in FIG. 14 that the cumulated phase of the LH-TL, in response to its hyperbolic shape, exhibits a nearly 180° difference with respect to the 90° RH-TL over a wide frequency range and that the CRLH-TL keeps that 180° difference over an even broader bandwidth, while the phase difference between the 270° RH-TL and 90° RH-TL changes linearly with respect to frequency. These phase differences compared to the phase of the 90° RH-TL are shown in FIG. 15. The bandwidths, defined by ±10° phase difference are 11% for the 270° RH-TL, 60% for the LH-TL, and 70% for the CRLH-TL. The LH-TL and CRLH-TL show wider bandwidths compared to the 270° RH-TL.

FIG. 4A illustrates by way of example the CRLH-TL hybrid ring according to the present invention. The substrate for the hybrid ring is preferably RT/Duroid 5880 ($\epsilon_r$=2.2, 1.57 mm thickness), or similar, although any suitable material may be employed for this and the other embodied aspects of the invention.

The characteristic impedance of the 270° RH-TL in the conventional hybrid ring was intentionally slightly shifted from that of the other 90° RH-TLs to provide a broader bandwidth. The broadest possible bandwidth, defined by ±0.25 dB amplitude balance, was obtained with the width $w_2$=2.25 mm, corresponding to the characteristic impedance of 79.3Ω at 2 GHz, while the width of the 90° RH-TLs $w_1$ was set to 2.77 mm (70.7Ω).

In one embodiment the CRLH-TL was implemented in chip components (1.6×0.8 mm$^2$). The values of capacitances and inductances for the CRLH-TL were chosen to have a −90° phase rotation and the same characteristic impedance as that of the 270° RH-TL at 2 GHz. The resulting values were: $C_1$=1.0+1.2 pF, $C_2$=1.2 pF, $C_3$=1.0 pF, $C_4$=1.0+1.0 pF, L=4.7+4.7 nH. Since these chip components have self-resonant frequencies, parallel and series configuration were used to avoid the limitation by the self-resonance.

The radiuses of the two hybrids were $r_R$=26.6 mm for the conventional one and $r_L$=14.6 mm for the proposed one, respectively. Consequently, the outer areas of the rings were 2460 mm$^2$ and 800 mm$^2$, respectively. The size of the proposed hybrid was thus reduced by 67% from that of the conventional hybrid.

Figure 16A:
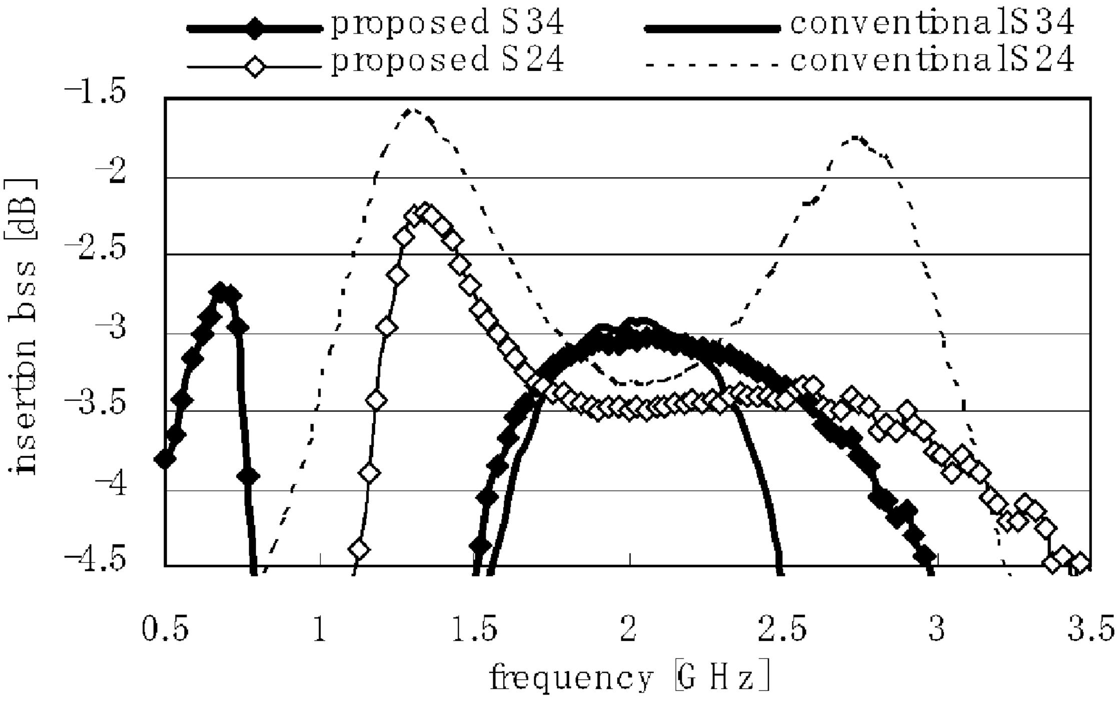
FIG. 16A-16C are graphs of insertion loss, phase balance, and isolation, respectively, for the hybrid ring of FIG. 4A.
Figure 16B:
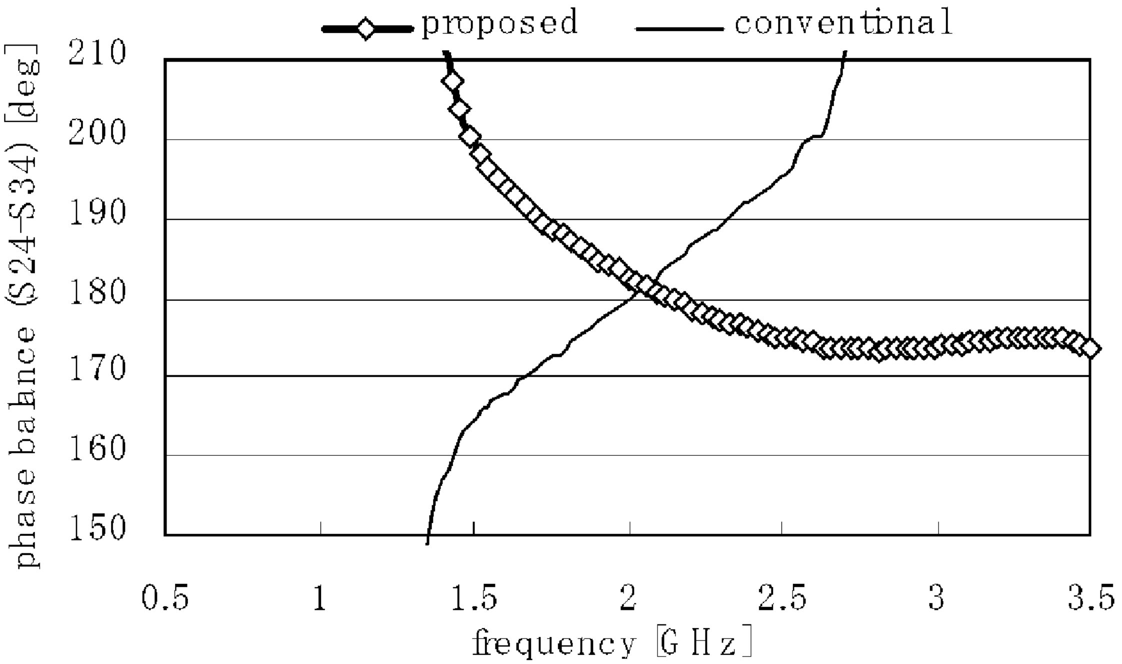
Figure 16C:
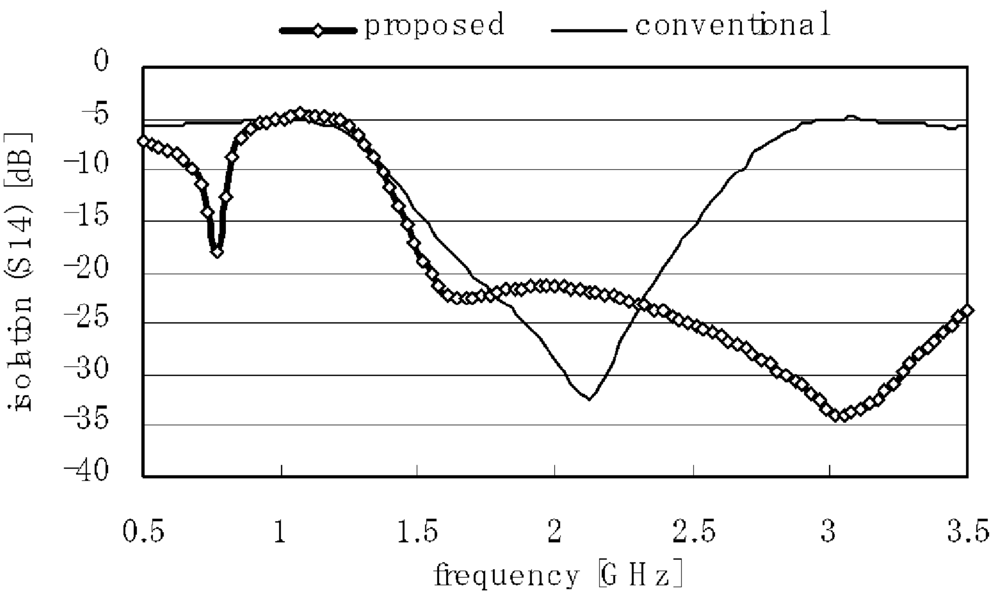

FIG. 16A-16C depict measured characteristics of the fabricated hybrid ring, giving insertion loss (FIG. 16A), phase balance (FIG. 16B), and isolation (FIG. 16C). FIG. 16A shows the measured insertion-loss characteristics of the fabricated hybrids. The bandwidth of this embodiment of the CRLH hybrid of the present invention is 1.646 GHz to 2.615 GHz (45.5%, −3.28 ±0.25 dB); while the bandwidth of the conventional hybrid is 1.727 GHz to 2.324 GHz (29.5%, −3.17 ±0.25 dB). The bandwidth of the proposed hybrid was enhanced by 54% compared to that of the conventional hybrid ring, while the average magnitude was reduced by only 0.11 dB.

FIG. 16B shows the phase balances of the fabricated hybrids. The phase balances, within the range of 180°±10°, are from 1.682 GHz to more than 3.5 GHz for the inventive CRLH hybrid compared with from 1.670 GHz to 2.325 GHz for the conventional hybrid.

FIG. 16C shows the isolation characteristics of the fabricated hybrids. Isolations better than 20 dB were obtained from 1.544 GHz to more than 3.5 GHz for the inventive hybrid while they only extended from 1.686 GHz to 2.383 GHz for the conventional hybrid.

The results seen in FIG. 16A through 16C demonstrate that the inventive hybrid ring not only can be implemented in less space, but also exhibits a significant bandwidth enhancement compared with the conventional hybrid ring. This bandwidth enhancement is due to the frequency dependence of the insertion phase in the CRLH-TL, as previously described.

The characteristics at higher frequencies are influenced by the self-resonance of the chip components. However, using the MMIC process such as metal-insulator-metal (MIM) capacitors and spiral inductors, the characteristics of LH-TLs in the higher frequency range can be improved.

It should therefore be appreciated that the CRLH-TL hybrid ring is a novel, small-size, broad-band hybrid ring that uses a LH-TL in place of the conventional 270° RH-TL of the conventional hybrid ring. The inventive CRLH-TL hybrid showed a 54% bandwidth enhancement and 67% size reduction compared to a conventional hybrid ring at a frequency of 2 GHz.

4. Dual-Band Non-Harmonic Branch-Line Coupler.

A branch-line coupler (BLC) according to the present invention operates at two arbitrary working frequencies using left-handed (LH) transmission lines (TLs). The analysis of the structure is based on the even-odd mode analysis of the conventional BLC as well as a recently developed model for the LH-TL. It is demonstrated herein that the two operating frequencies can be obtained by tuning the phase slope of the different line sections. An embodiment of the invention is described, by way of example and not limitation, which is demonstrated by both simulation and measurement results. The center frequencies of the two pass-bands for the described embodiment are 920 MHz and 1740 MHz, respectively.

Recently, increased attention has been directed at LH materials (LHM) within the microwave community, with practical realizations of the LH materials, and proposals of lumped-element (LE) two-dimensional structures. The equivalent LE model of the LH-TL shows that it provides negative phase delay or phase advance. On the other hand, the conventional TL, which is referred to as the right-handed (RH) TL (RH-TL) as denoted within this application, has positive phase delay.

It has not been fully appreciated within the industry, however, the size and bandwidth enhancement that can be realized with LHM, such as within BLC implementations. The conventional BLC is made up of quarter wavelength lines and it can only operate at the fundamental frequency and at odd harmonics of the fundamental frequency. It is beneficial within modern wireless communication standards, in particular those supporting multiple bands, to provide dual band components in order to reduce number of components for implementation.

In an aspect of the present invention the LH-TL concept described above is applied to realize a versatile design of the BLC in which the second operating frequency can be established at any arbitrarily selected frequency. It should be appreciated that the negative phase delay extends the flexibility of the phase control of each branch line in the BLC. Thus, the design proposed in the present invention provides a way for using one single quadrature hybrid to operate at two arbitrary frequencies.

FIG. 12A and FIG. 12B, described previously, provided background on the unit cells of artificial RH-TL and LH-TLs, respectively. The artificial LE is obtained by cascading N times the unit cells shown in FIG. 12B, provided that the phase-shift induced by these unit cells be much smaller than 2π.

The LH-TL is the electrical dual of the conventional RH-TL, in which the inductance and capacitance have been interchanged. The phase delay of the unit cell of the artificial RH and LH-TL are $$\phi_R = -\arctan\left[\omega(L_R/Z_{0R} + C_R Z_{0R})/(2-\omega^2 L_R C_R)\right] < 0, \quad (14A)$$

$$\phi_L = -\arctan\left[\omega(L_L/Z_{0L} + C_L Z_{0L})/(1-2\omega^2 L_L C_L)\right] > 0 \quad (14B)$$

with the characteristic impedances $$Z_{0R} = \sqrt{L_R/C_R},\ Z_{0L} = \sqrt{L_L/C_L} \quad (15)$$

where the indexes R and L refer to RH and LH, respectively. The RH-LH has a negative phase (phase lag), while the LH-TL has a positive phase (phase advance). A CRLH-TL is the series combination of a LH-TL and a RH-TL, leading to the phase delay of the unit cell of the artificial CRLH-TL represented by the following.

$$\phi_C = \phi_R + \phi_L, \quad (16)$$

where index C denotes CRLH, which becomes $N\phi_C$ for the N-cells implementation of the line. At low frequencies, the phase response is dominated by the LH contribution while at high frequencies, the phase response is dominated by the RH contribution.

Figure 17:
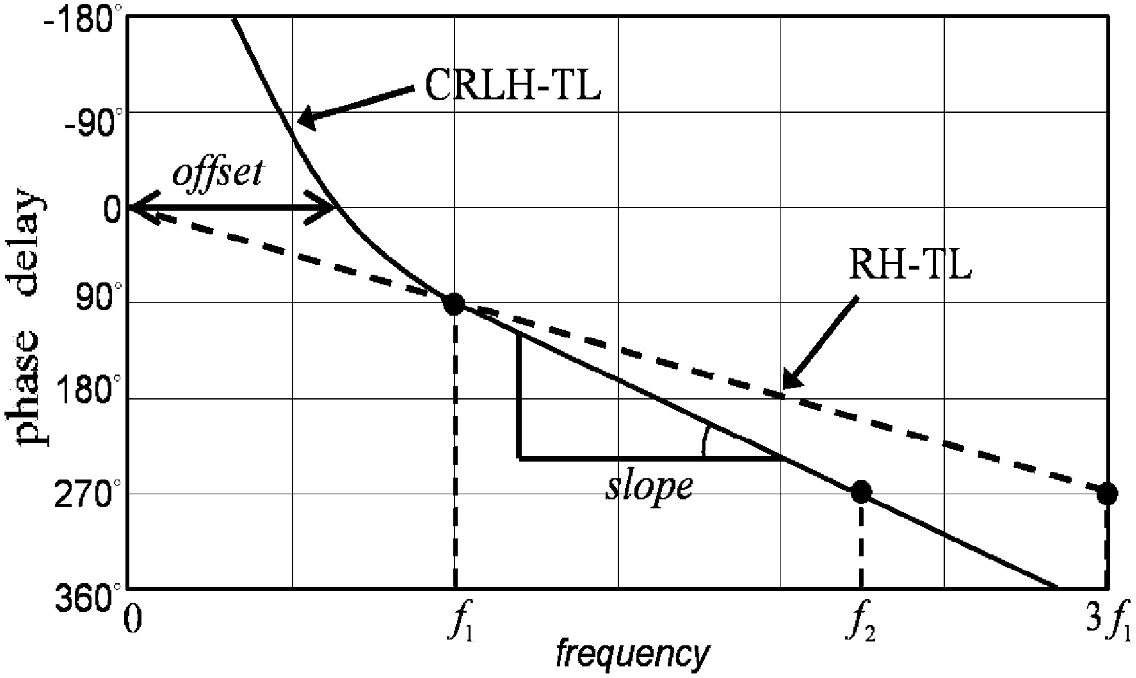
FIG. 17 is a graph of phase response for the branch-line coupler of FIG. 5A, showing RH-TL and CRLH-TL phase responses.

FIG. 17 illustrates a typical phase response of the RH-TL (dashed line) in comparison with the CRLH-TL (solid curved line). The LH-TL provides an offset from DC in the lower frequency range, while the RH-TL provides an arbitrary slope in the upper frequency range, which is the range of operation for the BLC proposed in this aspect of the invention. The combination of these two effects allows reaching any desired pair of frequencies. This is in contrast to the conventional case where, once the operating frequency corresponding to 90° is chosen, the next usable frequency necessarily corresponds to 270° because the phase curve is a straight line from DC to that frequency.

Each branch-line of the coupler according to the present invention is designed as a CRLH-TL. The two $Z_0$ lines have a characteristic impedance of 50Ω and the two lines have the characteristic impedance of 35Ω. If the center frequencies are chosen as $f_1$ and $f_2$ in FIG. 17, the phase delays are 90° at $f_1$ and 270° at $f_2$. The phase delays of the CRLH-TL at $f_1$ and $f_2$ can be written as follows.

$$N\phi_C(f_1) = \pi/2 \quad (17)$$

$$N\phi_C(f_2) = 3\pi/2 \quad (18)$$

where $$f_2 = \alpha f_1 \quad (19)$$

According to the present invention α need not be an integer quantity. Eq. (14A)-(16), (17) and (18) can be written into the following simpler approximate expressions.

$$Pf_1 - Q/f_1 \approx \pi/2 \quad (20)$$

$$Pf_2 - Q/f_2 \approx 3\pi/2 \quad (21)$$

$$P = 2\pi N\sqrt{L_R C_R},\ Q = N/(2\pi\sqrt{L_L C_L}) \quad (22)$$

Figure 18:
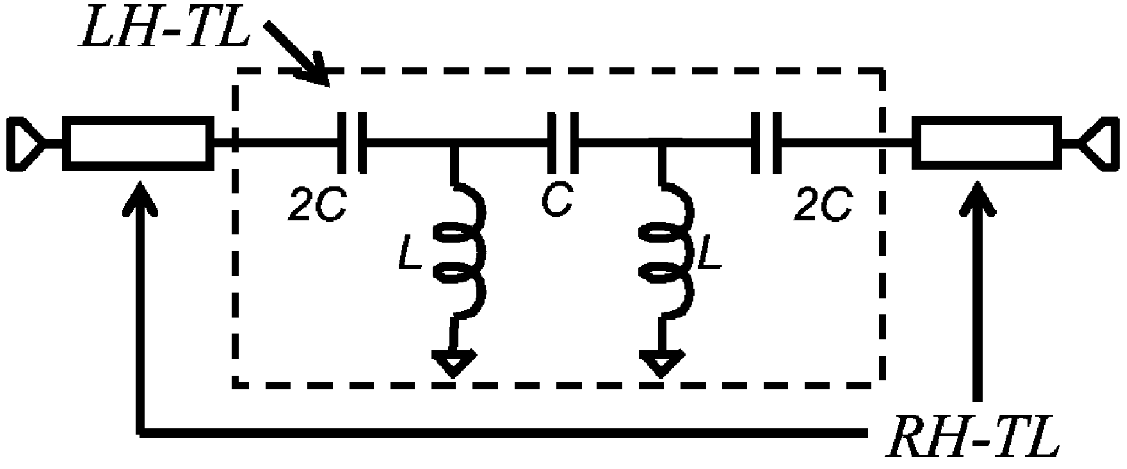
FIG. 18 is a schematic of a CRLH-TL for each branch-line of the branch-line coupler of FIG. 5A.

FIG. 18 is a schematic of the artificial CRLH-TL used for each branch-line according to the present aspect of the invention, consisting of two unit cells including two series capacitors of value 2C and one shunt inductor of value L for symmetry. It should be recognized that the series combination of two capacitors of value 2C can be equivalently implemented as a single capacitor of value C. The RH-TL is depicted as a simple microstrip line on each side of the LH section. The size of this circuit may be reduced by replacing the microstrip line with lumped-distributed-elements.

A method of implementing the BLC can be taken from the prior analysis and generally described by the following steps:

1. Choose $f_1$ and $f_2$;
2. Solve Eq. (19) through Eq. (21) for P and Q;
3. Use Q to determine the $L_L C_L$ product with the chosen N;
4. Calculate the values of $L_L$ and $C_L$ so that $L_L C_L$ satisfies Eq. (22), and Eq. (16) is satisfied for the desired impedance, such as 35Ω and 50Ω; and
5. Use $Pf_1$ or $Pf_2$ to obtain the electrical length of the RH-TL and hence its physical length using standard microstrip line formulas.

Figure 19:
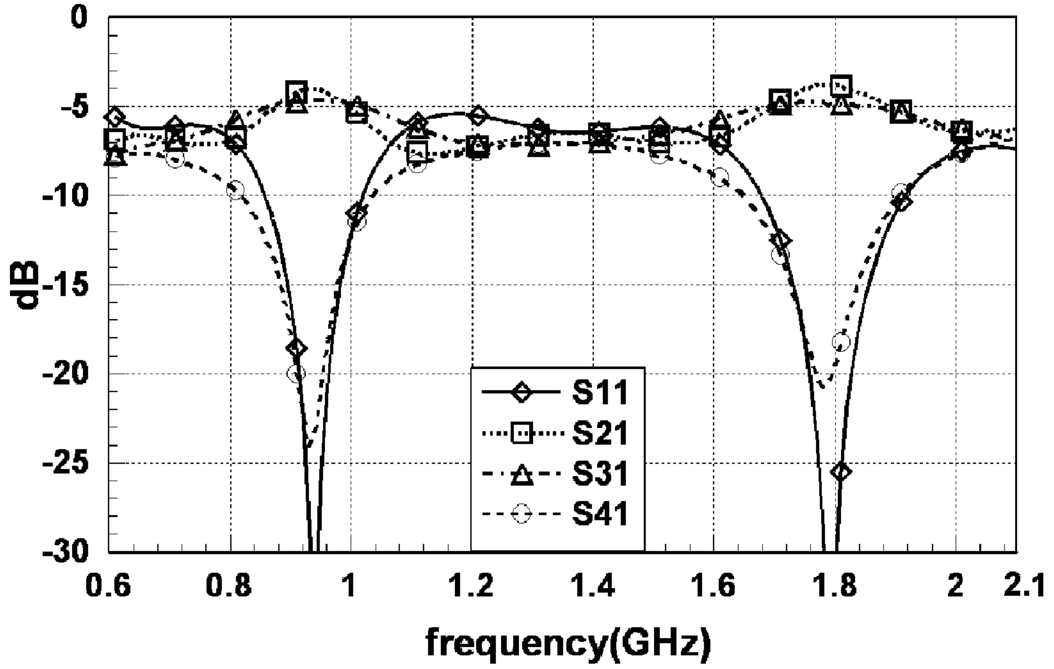
FIG. 19 is a graph of simulated frequency response for the branch-line coupler of FIG. 5A, showing the two arbitrary coupling frequencies.

FIG. 19 illustrates a full-wave simulation result of the distributed parts, following the method outlined above for a practical implementation of the BLC. The center frequencies of two pass-bands are chosen as $f_1$=930 MHz and $f_2$=1780 MHz.

Surface mount chip components for any of the described aspects of the present invention can be obtained from a number of manufacturers, such as by Murata® Manufacturing Company Limited whose components were depicted in these embodiments.

Figure 20:
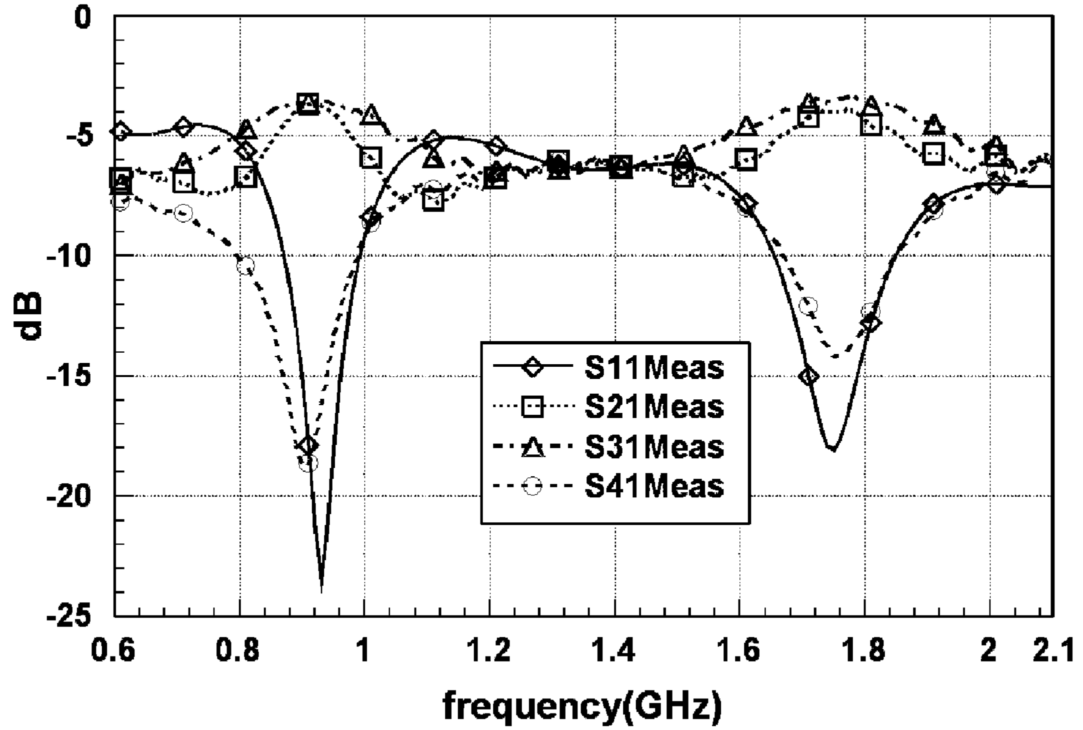
FIG. 20 is a graph of measured frequency response for the branch-line coupler of FIG. 5A, showing the two arbitrary coupling frequencies.
Figure 21:
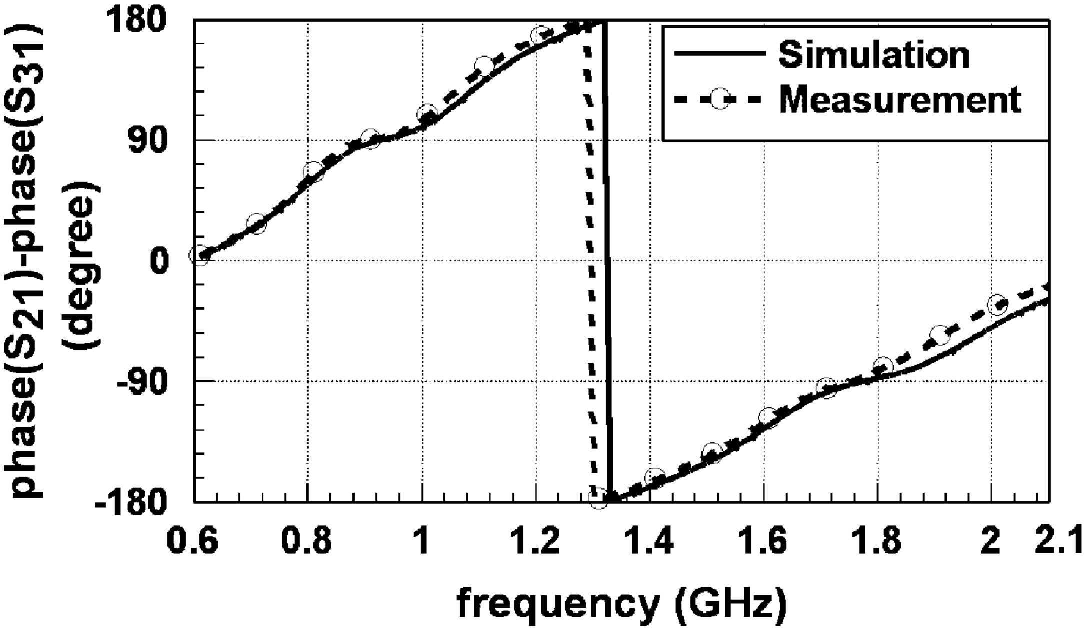
FIG. 21 is a graph of simulated and measured phase differences for the branch-line coupler of FIG. 5A.

FIG. 20 and FIG. 21 depicts measured results for the described BLC showing frequency response in FIG. 20 and phase difference in FIG. 21. It should be noted that the frequency dependence of actual chip components causes variations of the characteristic impedance of the LH-TL, which results in amplitude imbalance between the two output ports. To compensate for these effects, a tuning stub can be added to the 35Ω CRLH-TLs, with the measurement results shown in FIG. 20. The center frequencies are shifted to 920 MHz at the first pass-band and 1740 MHz at the second pass-band, respectively. In both cases, the phase difference between S31 and S21 is ±90° at $f_1$ and $f_2$, as shown in FIG. 21. The performances in both pass-bands are summarized in Table 2 and Table 3, respectively. The 1 dB-bandwidth is defined as the frequency range in which the amplitude unbalance between the two output signals is less than 1 dB and isolation/return loss is less than −10 dB.

It should be appreciated, therefore, that this aspect of the invention describes a novel BLC with two arbitrary operating frequencies. This arbitrary nature of the frequencies is obtained by replacing the conventional branch-lines by CRLH-TLs, in which the LH-TL provides an offset from DC and the RH-TL sets the appropriate slope to intercept the two frequencies. It should also be appreciated that LHM can be similarly applied to active circuits as well as to passive circuits.

The operating frequencies of the described embodiment under test were limited by the self-oscillation frequency of the surface mount (SMT) chip components. MMIC implementations of the proposed BLC to overcome frequency limitation of SMT chips may be useful in many dual-band applications of modern mobile communication and WLAN standards.

It should be appreciated that the present invention describes a number of inventive high-frequency coupler devices. Embodiments of these devices were shown and described by way of example, wherein it is not be construed that the practice of the invention is limited to these specific examples. The characteristics of these circuits can be varied according to the teachings of the present invention and what is known in the art to without departing from the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Coupling Levels Versus Gap (s) for 9 cell LH Coupler

| LH-$C_{BWD}$ (dB) | S (mm) | Conv-$C_{BWD}$ (dB) |
|---|---|---|
| −0.5 | 0.2 | −10.2 |
| −3 | 1.9 | −19.5 |
| −6 | 3.6 | −25.2 |
| −10 | 5.5 | −29.3 |
| −20 | 15.5 | <−40 |

TABLE 2

Performance in the First Pass-Band

| | Simulation | Measurement |
|---|---|---|
| Center Freq. | 930 MHz | 920 MHz |
| Return Loss | −28.180 dB | −21.242 dB |
| Output 1 | −4.028 dB | −3.681 dB |
| Output 2 | −4.717 dB | −3.593 dB |
| 1 dB-Bandwidth | 140 MHz (15%) | 110 MHz (12%) |
| Isolation | −24.096 dB | −17.617 dB |
| Phase Difference | 90.42° | 91.42° |

TABLE 3

Performance in the Second Pass-Band

| | Simulation | Measurement |
|---|---|---|
| Center Freq. | 1780 MHz | 1740 MHz |
| Return Loss | −28.431 dB | −17.884 dB |
| Output 1 | −3.821 dB | −4.034 dB |
| Output 2 | −4.804 dB | −3.556 dB |
| 1 dB-Bandwidth | 100 MHz (5.6%) | 150 MHz (8.6%) |
| Isolation | −20.821 dB | −13.796 dB |
| Phase Difference | −89.26° | −90.96° |

What is claimed is:

1. A hybrid-ring coupler apparatus for generating separate signal channels from a radio-frequency input, comprising:

a plurality of input lines configured for receiving an input signal;

a plurality of output lines interposed with said input lines; and a plurality of transmission lines, each transmission line (TL) connecting between neighboring said input line and said output line to form a ring;

wherein at least a portion of said TLs incorporate a composite right/left handed (CRLH) TL; and wherein capacitance and inductance contributions of a left-handed (LH) section and a right-handed (RH) section of said CRLH-TL are chosen so that a phase response of said CRLH-TL is dominated by a LH contribution at below a center frequency, while the phase response is dominated by a RH contribution at above the center frequency.

2. An apparatus as recited in claim 1, further comprising a 90° or 180°, isolated, output or combination along said TLs.

3. An apparatus as recited in claim 1, wherein said LH-TL section comprises a unit cell comprising a series capacitor with a shunt inductor.

4. An apparatus as recited in claim 1:

wherein said LH-TL section comprises a unit cell comprising a series capacitor with a shunt inductor; and wherein said LH-TL section comprises a lumped element capacitor in series with a lumped element shunt-inductor.

5. An apparatus as recited in claim 1:

wherein said LH-TL section comprises a unit cell comprising a series capacitor with a shunt inductor; and wherein said LH-TL section generates a −90° phase rotation which replaces a +270° phase rotation of a conventional RH-TL.

6. An apparatus as recited in claim 1, wherein said CRLH TL comprises RH-TL and LH-TL sections providing a total phase rotation of −90°.

7. An apparatus as recited in claim 1:

wherein said CRLH TL comprises RH-TL and LH-TL sections providing a total phase rotation of −90°;

wherein said RH-TL and LH-TL sections comprise three LH-TL sections and three RH-TL sections; and wherein said three LH-TL sections each generate a −35° rotation and said three RH-TL sections each generate 5° rotation to provide the total of −90° of phase rotation.

8. An apparatus as recited in claim 1, wherein said CRLH TL comprises a unit cell.

9. An apparatus as recited in claim 1:

wherein said CRLH TL comprises a unit cell;

wherein said unit cell comprises a series combination of a right-handed inductor and a left-handed capacitor; and wherein said series combination of said right-handed inductor and said left-handed capacitor is coupled to a paralleled combination of a right-handed shunt capacitor and a left-handed shunt inductor.

10. An apparatus as recited in claim 1, wherein said CRLH-TL comprises alternating left-handed (LH) capacitors and right-handed (RH) TL sections coupled in series, and LH inductors shunting said RH-TL sections.

11. A hybrid-ring coupler apparatus for generating separate signal channels from a radio-frequency input, comprising:

a plurality of input lines configured for receiving an input signal;

a plurality of output lines interposed with said input lines; and a plurality of transmission lines, each transmission line (TL) connecting between neighboring said input line and said output line to form a ring;

wherein at least a portion of said TLs incorporate a composite right/left handed (CRLH) TL.

12. An apparatus as recited in claim 11, wherein said CRLH TL comprises a unit cell.

13. An apparatus as recited in claim 11:

wherein said unit cell comprises a series combination of a right-handed inductor and a left-handed capacitor; and wherein said series combination of said right-handed inductor and said left-handed capacitor is coupled to a paralleled combination of a right-handed shunt capacitor and a left-handed shunt inductor.

14. An apparatus as recited in claim 11, wherein said CRLH-TL comprises alternating left-handed (LH) capacitors and right-handed (RH) TL sections coupled in series, and LH inductors shunting said RH-TL sections.

15. A hybrid-ring coupler apparatus for generating separate signal channels from a radio-frequency input, comprising:

a plurality of input lines configured for receiving an input signal;

a plurality of output lines interposed with said input lines; and a plurality of transmission lines, each transmission line (TL) connecting between neighboring said input line and said output line to form a ring;

wherein at least a portion of said TLs comprises a composite right/left-handed (CRLH) TL having right-handed transmission line (RH-TL) and left-handed transmission line (LH-TL) sections providing a total phase rotation of −90°.

16. An apparatus as recited in claim 15:

wherein said RH-TL and LH-TL sections comprise three LH-TL sections and three RH-TL sections; and wherein said three LH-TL sections each generate a −35° rotation and said three RH-TL sections each generate 5° rotation to provide the total of −90° of phase rotation.

* * * * *